(12) United States Patent
Tobin

(10) Patent No.: US 7,505,913 B2
(45) Date of Patent: Mar. 17, 2009

(54) METHOD AND SYSTEM FOR CUSTOMIZING MARKETING SERVICES ON NETWORKS COMMUNICATING WITH HYPERTEXT TAGGING CONVENTIONS

(75) Inventor: William J. Tobin, Stamford, CT (US)

(73) Assignee: Commerce Technology Licensing, L.L.C., Marco Island, FL (US)

( * ) Notice: Subject to any disclaimer, the term of this patent is extended or adjusted under 35 U.S.C. 154(b) by 753 days.

(21) Appl. No.: 09/782,271

(22) Filed: Feb. 13, 2001

(65) Prior Publication Data

US 2001/0007991 A1 Jul. 12, 2001

Related U.S. Application Data

(63) Continuation of application No. 09/563,352, filed on May 3, 2000, now abandoned, which is a continuation of application No. 08/785,321, filed on Jan. 21, 1997, now Pat. No. 6,141,666.

(60) Provisional application No. 60/017,229, filed on May 9, 1996, provisional application No. 60/010,372, filed on Jan. 22, 1996.

(51) Int. Cl.
*G06Q 99/00* (2006.01)
(52) U.S. Cl. .............................. 705/1; 705/14; 705/27; 715/500
(58) Field of Classification Search ................ 705/1, 705/39, 400, 14, 26; 395/200.12, 200.11; 707/4; 709/229, 227; 715/500
See application file for complete search history.

(56) References Cited

U.S. PATENT DOCUMENTS

| | | | | |
|---|---|---|---|---|
| 5,220,655 A | * | 6/1993 | Tsutsui | 709/229 |
| 5,289,371 A | * | 2/1994 | Abel et al. | 705/5 |
| 5,319,542 A | | 6/1994 | King, Jr. et al. | |
| 5,537,314 A | * | 7/1996 | Kanter | 705/14 |

(Continued)

FOREIGN PATENT DOCUMENTS

EP 987642 3/2000

(Continued)

OTHER PUBLICATIONS

The well-merchandised Web site; Hise, Phaedra, Inc.; Oct. 1995, vol. 17 Issue 14, p. 83, 3p,3c.*

(Continued)

*Primary Examiner*—John W. Hayes
*Assistant Examiner*—Freda A. Nelson
(74) *Attorney, Agent, or Firm*—Lerner, David, Littenberg, Krumholz & Mentlik, LLP

(57) ABSTRACT

The present server based communications system provides dynamic customization of hypertext tagged documents presented to clients accessing the system. The customization, which pertains to the content of the documents, is based on the specific requirements of a class to which the client belongs to. The class may be defined by the identity of the source which refers the client to the system. The system utilizes a database which dynamically retrieves stored data in response to a server software tool which configures the data into hypertext tagged documents. The system utilizes a dynamic token scheme to pass the identity of the referring network site from document to document to eventual purchase document accessed by the client through the hypertext tags.

26 Claims, 39 Drawing Sheets

U.S. PATENT DOCUMENTS

| | | | |
|---|---|---|---|
| 5,572,643 A | | 11/1996 | Judson |
| 5,576,951 A | * | 11/1996 | Lockwood .................. 395/227 |
| 5,590,197 A | | 12/1996 | Chen et al. |
| 5,649,186 A | * | 7/1997 | Ferguson .................... 395/610 |
| 5,706,434 A | * | 1/1998 | Kremen et al. ......... 395/200.09 |
| 5,708,780 A | * | 1/1998 | Levergood et al. .......... 709/229 |
| 5,710,887 A | * | 1/1998 | Chelliah et al. ............. 395/226 |
| 5,712,979 A | * | 1/1998 | Graber et al. ............... 709/224 |
| 5,715,314 A | * | 2/1998 | Payne et al. .................... 705/78 |
| 5,717,860 A | * | 2/1998 | Graber et al. ............... 709/227 |
| 5,724,424 A | * | 3/1998 | Gifford ......................... 705/79 |
| 5,740,430 A | * | 4/1998 | Rosenberg et al. .......... 707/200 |
| 5,745,681 A | | 4/1998 | Levine et al. |
| 5,752,022 A | | 5/1998 | Chiu |
| 5,761,662 A | | 6/1998 | Dasan |
| 5,768,510 A | * | 6/1998 | Gish .......................... 709/202 |
| 5,794,207 A | * | 8/1998 | Walker et al. .................. 705/1 |
| 5,796,393 A | * | 8/1998 | MacNaughton et al. ..... 345/329 |
| 5,796,952 A | * | 8/1998 | Davis et al. ................. 709/224 |
| 5,799,285 A | * | 8/1998 | Klingman .................... 705/26 |
| 5,812,769 A | * | 9/1998 | Graber et al. ............... 709/228 |
| 5,819,092 A | * | 10/1998 | Ferguson et al. ............ 717/113 |
| 5,819,285 A | * | 10/1998 | Damico et al. ........... 707/104.1 |
| 5,839,117 A | * | 11/1998 | Cameron et al. .............. 705/27 |
| 5,845,303 A | | 12/1998 | Templeman |
| 5,852,809 A | * | 12/1998 | Abel et al. ..................... 705/26 |
| 5,855,008 A | * | 12/1998 | Goldhaber et al. ............ 705/14 |
| 5,864,822 A | * | 1/1999 | Baker, III ..................... 705/14 |
| 5,870,718 A | * | 2/1999 | Spector ........................ 705/26 |
| 5,890,175 A | * | 3/1999 | Wong et al. ................. 707/505 |
| 5,897,622 A | * | 4/1999 | Blinn et al. ................... 705/26 |
| 5,907,830 A | * | 5/1999 | Engel et al. ................... 705/14 |
| 5,918,014 A | | 6/1999 | Robinson |
| 5,918,214 A | * | 6/1999 | Perkowski ................... 705/27 |
| 5,933,811 A | * | 8/1999 | Angles et al. ................. 705/14 |
| 5,991,740 A | | 11/1999 | Messer |
| 6,009,413 A | * | 12/1999 | Webber et al. ................ 705/26 |
| 6,009,429 A | | 12/1999 | Greer et al. |
| 6,016,504 A | | 1/2000 | Arnold et al. |
| 6,016,514 A | | 1/2000 | Cink et al. |
| 6,018,748 A | | 1/2000 | Smith |
| 6,029,141 A | | 2/2000 | Bezos et al. |
| 6,029,142 A | * | 2/2000 | Hill .............................. 705/27 |
| 6,061,057 A | * | 5/2000 | Knowlton et al. ......... 705/26 X |
| 6,141,666 A | * | 10/2000 | Tobin ......................... 715/207 |
| 6,249,291 B1 | * | 6/2001 | Popp et al. .................. 345/473 |
| 6,278,966 B1 | * | 8/2001 | Howard et al. ................ 703/23 |
| 6,594,692 B1 | * | 7/2003 | Reisman ..................... 709/219 |
| 2001/0007991 A1 | | 7/2001 | Tobin |
| 2001/0042064 A1 | * | 11/2001 | Davis et al. ..................... 707/3 |

FOREIGN PATENT DOCUMENTS

| | | | |
|---|---|---|---|
| JP | 09171511 A | | 6/1997 |
| JP | 09171511 A | * | 6/1997 |

OTHER PUBLICATIONS

Toll booths on the info highway; Sullivan, R. Lee, Forbes; Mar. 25, 1996, vol. 157 Issue 6, p. 118, 1p, 1 chart.* www.Onlinemarketingtoday.com; "PC Flowers takes gourmet gifts online-new interactive catalog service called PC Gifts & Gourmet on Prodigy", Nov. 1, 1994.*

Mangelsdorf, Martha E., "The Hottest Entrepreneurs in America", Dec. 1992, Inc. Magazine.*

Hise, Phaedra; "Prodigy: Smart Sales Channel?", Feb. 1994, Inc. Magazine.*

Forbes, Thomas; "Far out", Sep. 15, 1994, Folio : The Magazine for magazine Management, v23n15, pp. 64-65.*

Hawkins, Donald T., "Electronic advertising on online information systems", Mar. 1994, Online, v18n2, pp. 26-39.*

Florey, Kevin, "Who's Been Peeking At My Clickstream?", Fall 1995, MIT paper, 11 pgs.*

Dyerson et al., "The Boomerang White Paper: a Page As You Like It", Dec. 1995, In the Proceedings of the Fourth International World Wide Web Conference, Boston, Mass, Dec. 1995, pp. 667-676.*

Bamboo, Scott, "A Brief History of Affiliate Marketing", Oct. 22, 2007, Onlinebusinessrevenue.info, 3 pgs.*

Ash, Todd; "The History of Affiliate Programs- Designed for Success!", Apr. 21, 2008, Country-investment.com, 3 pgs.*

Collins, Shawn, "History of Affiliate Marketing", Nov. 10, 2000, Clickz.com, 3 pgs.*

"Interactive Facts Inks Agreements With Information Access, Electronic Newstannd", May 23, 1994, Interactive Facts, v1, n13, 2 pgs.*

Forbes, Thomas, "Far out", Sep. 15, 1994, Folio: The Magazine for Magazine Management, v23n15, pp. 64-65.*

Hawkins, Donald T., "Electronic Advertising on Online Information Systems", Mar. 1994, Online, v18n2, pp. 26-39.*

Florey, Kevin, "Who's Been Peeking At My Clickstream?", Fall 1995, MIT paper, 11 pgs.*

Dyerson et al., "The Boomerang White Paper: A Page As You Like It", Dec. 1995, In the Proceedings of the Fourth International World Wide Web Conference; Boston, Mass, Dec. 1995, pp. 667-676.*

Hise, Phaedra; "Prodigy: Smart Sales Channel?", Feb. 1994, Inc. Magazine, 2 pgs.*

"PC Flowers takes gourmet gifts online-new interactive catalog service called PC Gifts & Gourmet on Prodigy", Nov. 1, 1994; Onlinemarketingtoday.com, 4pgs.*

Kohda et al, Ubiquitous Advertising on the WWW: . . . 5th Int'l WWW conference, Paris, 1996, <www5conf.inria.fr/fich_html/slides/smesforum/PS17/P52/All.html.*

Mitch Ratcliffe, *Write Once, Publish Many Times: Electric Classifieds, Inc.'s Flexible Publishing Technology*, Digital Media, v.5, n.3, p. 9, 6 pages (dated Aug. 7, 1995).

Arthur M. Keller, et al, *A Smart Catalog and Brokering Architecture For Electronic Commerce*, http://www-db.stanford.edu/pub/keller/1994/cnet-cat-arch.pdf, 3 pages (dated Dec. 1994).

Robert Neches, et al., *Electronic Commerce on the Internet*, 13 pages (date unknown).

William Kennedy & Jeanne Dietsch, *Making Money Online*, Sun World, 22 pages (dated Sep. 1995).

William T. Wong & Arthur M. Keller, *Developing an Internet Presence with On-line Electronic Catalogs*, www-db.standford.edu/pub/keller/1994/cnet-online-cat.pdf, 4 pages (dated Oct. 9, 1994).

Stuart Elliott, *The Media Business: Advertising; A Report Lays Down Guidelines For Any Attempt To Measure The Efficiency Of Interactive Ads*, The New York Times, 4 pages (dated Oct. 3, 1995).

Sirkka Jarvepaa & Blake Ives, *Digital Equipment Corporation: The Internet Company (A)*, http://www2000.ogsm.vanderbilt.edu/intelligent.agent/dec/interest.html, 12 pages (dated Oct. 1994).

Donna L. Hoffman, et al., *Commercial Scenarios for the Web: Opportunities and Challenges*, http://www.ascusc.org/jcmc/voli/issue3/hoffman.html, 21 pages (date unknown).

Arie Segev, et al., *Electronic Catalogs: a Technology Overview and Survey Results*, {segev,dxw,beam}@haas.berkeley.edu, 8 pages (date unknown).

Arthur M. Keller, *Smart Catalogs and Virtual Catalogs*, http://www-db.stanford.edu/pub/keller/1995/virtual-catalogs.pdf, 11 pages (date unknown).

USDC, D.N.J., Subpena in Civil Case No. 04-1264 SLR; *BTG International Inc. v. Amazon.com, Inc.*, to William Tobin, Mar. 11, 2005.

History of Companies Founded an Funded by William J. Tobin, Entrepreneur of the Year 1992 Award Recipient, Bates No. Tobin-01718-Tobin-01728.

PC Flowers & Gifts, Inc., http://www.pcflowers.com, Confidential Memorandum, Bates No. Tobin-00001-Tobin-00084.

PC Flowers & Gifts, "The Pioneer in Floral & Gift Marketing Since 1989," Bates No. Tobin-00085-Tobin-00153.

Declaration of Rodney Robinson, dated Jun. 16, 2004, Bates No. Tobin-00807-Tobin-00809.

Declaration of Rodney Robinson, dated Aug. 31, 2004, Bates No. Tobin-00810-Tobin-00812.

Declaration of Alfred Werner, dated Aug. 24, 2001, Bates No. Tobin-00804-Tobin-00806.

Declaration of Rodney Robinson, dated Sep. 14, 2001, Bates No. Tobin-00813-Tobin-00814.
Declaration of Pattiann McAdams, dated Sep. 4, 2001, Bates No. Tobin-00815-Tobin-00816.
Linkage Agreement, by and between PC Flowers & Gifts, Inc., and Time Inc., dated Aug. 6, 1996, Bates No. Tobin-00840-Tobin-00847.
Letter from William J. Tobin at PC Flowers & Gifts to Marie Blue at Time, Inc., dated Jan. 22, 1996, Bates No. Tobin-00848-Tobin-00850.
Letter from Greg Shove, VP, Interactive Marketing, at America OnLine to Bill Tobin at PC Flowers & Gifts, dated Aug. 20, 1996, Bates No. Tobin-00851.
Letter from William J. Tobin of PC Flowers & Gifts to Ted Leonsis at America Online, dated Mar. 18, 1996, Bates No. Tobin-00852-Tobin-00853.
Letter from William J. Tobin of PC Flowers & Gifts to Janice Brandt at America OnLine, with enclosed proposal, dated Mar. 30, 1996, Bates no. Tobin-00854-Tobin-00860.
Letter from Greg Shove at America OnLine to William Tobin, dated Aug. 20, 1996, Bates No. Tobin-00861.
USDC, E.D. VA, Complaint Civil Action No. 01-251-A, *Internet Consultants, LLC,* v. *America OnLine, Inc.*, dated Feb. 14, 2001, Bates No. Tobin-00899-Tobin-00902.
ClickZ Today, http://www.clickz.com/article/cz.2790.html, May 14, 2001, Bates No. Tobin-00981-Tobin-00985.
Declaration and Power to Attorney of William J. Tobin to Arthur L. Plevy of Plevy & Associates, dated Nov. 20, 1997, Bates No. Tobin-01485.
Agreement for Internet Commerce Services, by and between Magnet Interactive Technologies, LLC and PC Flowers & Gifts, dated Jan. 15, 1996, Bates No. Tobin-01601-Tobin-01609.
CFOL.com—Co-branding Options for the CFOL Search Engine, http://cobrand.cfo1.com/, Apr. 25, 2000, Bates No. Tobin-01610.
PC Flowers & Gifts, screenshots, (c) 1995, Bates No. Tobin-01611-Tobin-01626.
Letter from William J. Tobin at PC Flowers & Gifts to Christin C. Shanahan at Time, Inc., and enclosures, dated Dec. 16, 1996, Bates No. Tobin-01627-Tobin-01631.
RHS Linux User, 04:31 PM Dec. 10, 1996, What we discussed on the phone, Bates No. Tobin-01632-Tobin-01633.
Al Hogan, 05:15 PM Dec. 10, 1996, Copy for the Coupon, Bates No. Tobin-01634.
Al Hogan, 12:34 PM Dec. 9, 1996, $10 off, Bates No. Tobin-01635.
Screenshots of PC Flowers & Gifts at pathfinder shop by occasion, © 1995, Bates No. Tobin-01636-Tobin-01653.
PC Flowers & Gifts at pathfinder website, Sales Report, May 1-May 31, 1997, Bates No. Tobin-01654-Tobin-01655.
PC Flowers & Gifts at pathfinder website, Sales Report, Apr. 1-Apr. 30, 1997, Bates No. Tobin-01656-Tobin-01658.
PC Flowers & Gifts at pathfinder website, Sales Report, Feb. 1-Feb. 28, 1997, Bates No. Tobin-01659.
PC Flowers & Gifts at pathfinder website, Sales Report, Jan. 1-Jan. 31, 1997, Bates No. Tobin-01660.
PC Flowers & Gifts at pathfinder website, Sales Report, Dec. 1-Dec. 31, 1996, Bates No. Tobin-01661.
Letter from William J. Tobin at PC Flowers & Gifts to Christin C. Shanahan at Time Inc., New Media, dated Jan. 16, 1997, Bates No. Tobin-01662.
PC Flowers & Gifts at pathfinder website, Sales Report, Nov. 1-Nov. 30, 1996, Bates No. Tobin-01663.
PC Flowers & Gifts at pathfinder website, Sales Report, Oct. 1-Oct. 31, 1996, Bates No. Tobin-01664.
Screenshot of Tobin Internet Speech, Bates No. Tobin-01701.
Letter from William J. Tobin of PC Flowers & Gifts to Marie Blue at Time, Inc., and enclosures, dated Jan. 22, 1996, Bates No. Tobin-01702-Tobin-01704.
Screenshots of Pathfinder from Time Warner, webmaster@www.timeinc.com, Bates No. Tobin-01705-Tobin-01710.
Print out copy of powerpoint presentation enttitled: Time, Inc. Meeting, Feb. 13, 1996, ©1996 Magnet Interactive Group, Inc., Bates No. Tobin-017811-Tobin-01716.

PCFN mock-up is at: www.magnet.com/-stacyb/pcfn/, Time, Inc. (Pathfinder) mock-up is at http://www.magent.com/-stacyb/pcf, Bates No. Tobin-0717.
Print out of powerpoint presentation entitled: PC Flowers & Gifts, www.pcflowers.com, The Freshest Flowers; the Greatest Gifts, Bates No. Tobin-01729-Tobin-01777.
CD Presentation entitled Show # 102, Bates No. Tobin-01778.
CD Presentation, Direct Marketing Association 77th Annual Conference, Bates No. Tobin-01779.
CD Presentation, The DMA 31st Spring Conference & Exhibition, Bates No. Tobin-01780.
Dyreson et al. "The Boomerang White Paper: a Page As You Like It", Nov. 1995, <www.w3.org>, pp. 1-17.
Mitch Ratcliffe, Writer Once, Publish Many Times: Electric Classifieds, Inc.'s Flexible Publishing Technology, Digital Media, v.5, n.3, p. 9, 6 pages (dated Aug. 7, 1995).
Arthur M. Keller, et al, A Smart Catalog and Brokering Architecture For Electronic Commerce, http://www.db.stanford.edu/pub/keller/1994/cnet-cat-arch.pdf, 3 pages (dated Dec. 1994).
Robert Neches, et al., Electronic Commerce on the Internet, 13 pages (date unknown).
William Kennedy & Jeanne Dietsch, Making Money Onine, Sun World, 22 pages (dated Sep. 1995).
William T. Wong & Arthur M. Keller, Developing an Internet Presence with On-line Electronic Catalogs, ###http://www.db.stanford.edu/pub/keller/1994/cnet-cat-arch.pdf, 4 pages (dated Oct. 9, 1994).
Stuart Elliot, The Media Business: Advertising; A Report Lays Down Guidelines For Any Attempt To Measure The Efficiency Of Interactive Ads, The New York Times, 4 pages (dated Oct. 3, 1995).
Shannon Nee, "Greeting for all seasons: Part Two," Sales & Marketing Management, vol. 146 No. 10, pp. 139-152, Sep. 1994.
Coddington, "Who Where? Announces Version 2.0 of internet directory assistance," Business Wire; New york (dated Apr. 30, 1996).
The Well-merchandised Web site; Hise, haedra, Inc.; Oct. 1995, vol. 17 Issue 14, p. 83, 3p,3c.
Toll booths on the info highway; Sullivan, R. Lee, forbes; Mar. 25, 1996, vol. 157 Issue 6, p. 118, 1p, 1 chart.
IBM and PC Flowers, "IBM and PC Flowers Announce teh Launch Of The Internet Consumer Incentive Traffic Program," Draft Press Release Dec. 1995.
Susan Watts, "Internauts' get chance to shop till they drop in cyberspace," The Independent (London) Home News Page; Dec. 8, 1994, p. 11.
Thomson Corporation Company, "The Quick Tour: A Summary of Approaches, " EDventure Holdings, Inc. Release 1.0, Jan. 24, 1995, No. 1, vol. 95, p. 6, ISSN: 1047-935X.
Donna L. Hoffman, et al., Marketing in Hypermedia Computer-Mediated Environments: Conceptual Foundations, http://www2000.ogsm.vanderbilt.edu/cmepaper.revision.july11.1995/cmepaper.html. printed Oct. 19, 2001.
File History for U.S. Patent No. 5,712,979, issued Jan. 27, 1998, to Graber et al. "Using The World Wide Web," 1994, Que corporation, David P. Ewing, Indianapolis, IN; "Commerce on the Internet," Thomas D.C. Little, Boston University, 1070-986X/94/9c) 1994 IEEE; "Streams Readies Release of Breakthrough Internet Media Planning and Assessment," Press Release, Streams, http://streams.com/press_release.html, printed Mar. 26, 1997; W3 Organization, "HTTP Request fields," http://www.w3.org/pub/WWW/Protocols/HTTP/HTRQ_Headers.html, pp. 1-5, May 3, 1994; Heylighen F., "World-Wide Web: a distributed hypermedia paradigm for global networking," Proceedings, SHARE Europe Spring Conference, pp. 355-368, Apr. 18, 1994; Brody H., "<Internet@crossroads.$$$>," Technology Review, vol. 98 ISSS. 4, pp. 24-31, May 1995; Wilmer, W. "Clarifications and Extensions for the Bootstrap Protocol," RFC1532 pp. 1-19, Oct. 1993; Bader, Rich "Electronics Publishing with Mosaic," PC Letter, v10, N14, P4(1), Aug. 15, 1994; Ury, Jill "Delahaye Group to Offer Net Bench," Business Wire, s1, p1, May 31, 1995; "Research Firms Strive for Web Tracking That Counts," Interactive Marketing News, v2, n13, Jun. 23, 1995; Lau, Teresa "Building A Hypermedia Information System on the Internet," Sun Microsystems Computer Corporation, 1994 IEEE; Resnick, Rosalind "Tread Lightly on the Internet," Home Office Computing, v.12, n4, p.80(2), Apr. 1994; Rothchild, Michael "Stagecoach Days on the Infohighwau," Forbes, v153, n5, p.S25(2), Feb. 28, 1994; LaPlante, Alice "Does Your Corporate Data Have Market Value?" InfoWorld, v15, n43, p.60(1), Oct. 1993; Foster, Marilyn S. "Hardcopy to Online Publications--It Can Be Done," IEEE, pp. 51-57, 1990.

Nee, Shannon "Greetings for all seasons: Part Two," vol. 146, No. 10, p. 139-152, ISSN: 0163-7517.

Business Wire, Inc., "WhoWhere? Announces Version 2.0 of Internet Directory Assistance," Connors Communications, Pamela Coddington, Apr. 30, 1996.

"Deposition of William James Tobin" and Exhibits, Jan. 24, 2006.

Agreement by and between PC Flowers & Gifts, Inc. and Time Inc., 37 Internet Consumer Traffic Incentive Program, May 3, 1995.

Person, Ron "Web Publishing with Word for Windows", 1995, Que Corporation, pp. 63-65 and 207-211.

Kirkka Jarvepaa & Blake Ives, Digital Equipment Corporation: The Internet Company (A), http://www2000.ogsm.vanderbilt.edu/intelligent.agent/dec/interest.html, 12 pages (date unknown) Oct. 1994.

Donna L. Hoffman, et al., Commercial Scenarios for the web: Opportunities and Challenges, http://www.ascusc.org/jcmc/vol1/issue3/hoffman.html, 21 pages (date unknown) 1997.

Arie Segev, et al., Electronic Catalogs: a Technology Overview and Survey Results, [segev,dxw,beam]@haas.berkeley.edu, 8 pages (date unknown) 1995.

Arthur M. Keller, et al, A Smart Catalog and Virtual Catalogs, http://www.db.stanford.edu/pub/keller/1995/virtual-catalogs.pdff, 11 pages (date unknown) 1995.

Kohda et al, Ubiquitos Advertising on the WWW: . . . , 5th Int'l WWW conference, Paris, 1996, <www5conf.inria.fr/fich.sub.13 html/slides/smesforum/PS17/P52/All.html>, May 1996.

Net Cloak User's Guide, 36 pages (dated 1995).

Getting Your Apple Internet Server Online, A Guide To Providing Internet Services, 35 pages (dated 1995).

Interfacing To The Web With DDE and OLE, http://cuinl.tripod.com/ebooks/web?ebook/ch3.htm, 14 pages (undated). Mar. 22, 1995.

Schizophrenic HTTP Server, http://inet.nttam.com, 9 pages, (dated May 10, 1995).

Ian S. Graham, The HTML Sourcebook Second Edition, pp. 475-477, 493, 591 Apr. 6, 1996.

Brent Heslop & Larry Budnick, HTML Publishing on the Internet, 19 selected pages (dated 1995).

Ian S., Graham, The HTML Sourcebook, pp. 351, 375, 379-380 (dated 1995).

David Fox & Troy Downing, HTML Web Publisher's Construction Kit, pp. 200-201, 207 (dated 1995).

Shannon R. Turlington, Walking the World Web, 36 selected pages (dated 1995).

David Siegel, Creating Killer Web Sites: The Art of Third-Generation Site Design, pp. 133-155 (dated 1996).

Attention Business Editors: Abacus Announces Release of Additional Internet Product, Canada Newswire Ltd., one page (dated Nov. 29, 1995).

Oracle Websystem Delivers Oracle7 Database Power to Create Dynamic, Multimedia Web Applications, PR Newswire Association, Inc., 3 pages (dated Oct. 30, 1995).

The Digital Foundry Inc. Unveils EndCap Storefront Application For The Microsoft Network, Business Wire, Inc., 2 pages (dated May 9, 1995).

Anonymous, "Ingredient Co-Branding: Net Firms Leverage Logos," Marketing Computers, Dialog file 570, an. 01613810, p. 12 (reprinted 2 pages) (Apr. 1997).

Business Editors & Computer Industry Writes, "Prodigy Ziff Davis: Prodigy Expands Alliance with Ziff-Davis; New Prodigy / ZD Net Features Include Daily News and ZD Net Personal Ciew Custom Service," Business Wire, Dialog File 810, an.0534502, 803 words Nov. 14, 1995.

Nancy C. Hirst, "Partners Create Success With Successful Images," Jackson Journal of Business, vol. 6 No. 8, pp. 28, Aug. 1989.

Mark Vogel, et al., "Re-defining co-op. (cooperative advertising) (includes related articles)" Sales & Marketing Management, vol. 145 No. 5, pp. 62(4), May 1993.

Elizabeth Castro, Visual Quickstart Guide: HTML for the World Wide Web, AT&T Library No. 005.754 C355h, 1996.

Robert A. McLean "Adventures / Robert A. McLean the Success of Cableshop," Boston Globe, vol. N/A, No. N/A, pp. 873 words, Sep. 15, 1982.

Judy Quinn "I" on merchandise, Incentive, vol. 170 No. 5, pp. 92-93, May 1996.

Anonymous, "Gift Certificates - The People's Choice," Incentive, vol. 1679 No. 2, pp. SS3-SS26 Date Unknown.

Kenny Chu and Francis Chin, HTML Publishing on the Internet, AT&T Library No. 005.75 C559h, 1996.

Laura LeMay & Brian K. Murphy, Laura LeMay's WEb Workshop: Creating Commercial Web Pages, pp. 101-121, 132-133, 243-265, 283-304, 363-376 (dated 1996).

* cited by examiner

FIG. 3

PC Flowers & Gifts:Birthday Gifts    http://www.pcflowers.com/cgi-bin/tokening.cgi?800/o_bday.htm  ← 3'

PC Flowers & GIFTS  116                                                                    214

[SHOP BY OCCASION]

Birthday Gifts

FTD Birthday Party Bouquet                             $34.95

Start off any birthday celebration with a festive basket filled with colorful Carnations, Pompons, Daisies, Statice, Alstroemeria and greenery.

The FTD Birthday Bouquet comes complete with noisemakers and a Happy Birthday banner!

Delivery:FTD Select Florist From:FTD — 301

304  302 — [FLOWERS] [BOUQUETS] — 303

Royal Velvet Roses                              $34.95-$74.95

If, as the poem suggests, your love is like a red, red Rose, "only one flower will do: Royal Velvet. These are the big bright velvety red, cultivated Roses that open quickly to full bloom, then stay fresh longer than others. They're especially welcome when the wind blows cold, because they have the magical ability to brighten a mood and turn everything 'rosy'. Petals are flawlessly shaped, and your assortment is matched by hand. Stems are super long. Royal Velvet Roses are always in perfect taste, always correct, always delightful. Includes Twelve Long Stem Roses.

Vase Choices:No Vase, Crystal Mikasa Vase

Delivery:2nd Day FedEx From:Nature's Blooms 305   302 — [FLOWERS] [DIRECT FROM GROWER] — 307

Superbatch Assortment                                $44.95

Don't just give one bouquet, give a Superbatch! This vivid assortment of riotous color is actually five tremendous bunches of beautiful flowers and one enormous batch of greenery. That's enough flowers for every room in the house!

No two of these giant, field-of-flowers bouquets are exactly alike. It's the home decorator's dream come true. So many flowers, they won't know where to start! It's the largest assortment of four different flower varieties available at a wholesale price. Vase not included.

Delivery:2nd Day FedEx From:Flowers Direct from the Grower 306   302 — [FLOWERS] [DIRECT FROM GROWER] — 307

PC Flowers & Gifts:Balloons     http://www.pcflowers.com/cgi-bin/totealrg.cgi?806/vendor03/balloons.htm → 5'

116 → PC Flowers & GIFTS     214

[SHOP BY CATEGORY]

Balloons

[VIEW • ORDERING INFO]
504

12 Latex Balloons     $19.95

Balloon bouquets make any festive occasion a celebration!

Choose latex balloons in a rainbow of colors for bouqets that last several hours.

Delivery: FTD Select Florist From: FTD

Some Suggested Occasions Include:     → 501

[BIRTHDAY] [ANNIVERSARY] [GET WELL] [ROMANTIC LOVE]
[THINKING OF YOU]

---

[VIEW • ORDERING INFO]
505

3 Mylar & 6 Latex Balloons     $24.95

Balloon bouquets make any festive occasion a celebration!

Choose latex balloons in a rainbow of colors that last several hours and shimmery printed mylar balloons that last a few weeks.

Mylar Balloon Choices: Baby Boy, Baby Girl, Congratulations, Get Well, Happy Birthday, Happy Anniversary, I Love You, Thank You, Thinking of You Delivery: FTD Select Florist From: FTD     → 502

Some Suggested Occasions Include:

[GET WELL] [BABY] [ROMANTIC LOVE] [THANK YOU] [THINKING OF YOU]
[BUSINESS]

---

[VIEW • ORDERING INFO]
506

6 Mylar Balloons     $29.95

Balloon bouquets make any festive occasion a celebration!

Choose shimmery printed mylar balloons for bouquets that last a few weeks.

Mylar Balloon Choices: Baby Boy, Baby Girl, Congratulations, Get Well, Happy Birthday, Happy Anniversary, I Love You, Thank You, Thinking of You Delivery: FTD Select Florist From: FTD     → 503

Some Suggested Occasions Include:

[BIRTHDAY] [ANNIVERSARY] [GET WELL] [CONGRATULATIONS] [BUSINESS]

PC Flowers & GIFTS

Order Form

Personalization
- Receiver's Name
- Personalization Text
- Closing
- Sender's Name

Receiver Information
- Name
- Address1
- Address2
- City  State  Zip
- Daytime Phone

Sender Information
- Name
- Address1
- Address2
- City  State  Zip
- Daytime Phone It is imperative that we receive your E-mail address in order to guarantee the successful processing of your order.

- E-mail Address

Delivery Information
- Delivery Date  □/□/□ (Month/Day/Year)
- Special Instructions

Credit Card Information
- ⦿ MasterCard  ○ Visa  ○ American Express  ○ Discover
- Cardholder's Name
- Card Number
- Expiration Date  □/□ (Month/Year)

1001

[ Place The Order ]

FIG. 13 http://pathfinder.pcflowers.com/o_bday.htm  PC Flowers & Gifts:Birthday Gifts  http://pathfinder.pcflowers.com/o_body.htm

PC Flowers & GIFTS at PATHFINDER

[SHOP BY OCCASION]

Birthday Gifts

FTD Birthday Party Bouquet — $34.95

Start off any birthday celebration with a festive basket filled with colorful Carnations, Pompons, Daisies, Statice, Alstroemeria and greenery.

The FTD Birthday Bouquet comes complete with noisemakers and a Happy Birthday banner!

Delivery:FTD Select Florist From:FTD — 301

[FLOWERS] [BOUQUETS] — 303

Royal Velvet Roses — $34.95-$74.95

If, as the poem suggests, your love is like a red, red Rose, only one flower will do: Royal Velvet. These are the big, bright, velvety red, cultivated Roses that open quickly to full bloom, then stay fresh longer than others. They're especially welcome when the wind blows cold, because they have the magical ability to brighten a mood and turn everything "rosy". Petals are flawlessly shaped, and your assortment is matched by hand. Stems are super long. Royal Velvet Roses are always in perfect taste, always correct, always delightful. Includes Twelve Long Stem Roses.

Vase Choices:No Vase, Crystal Hikasa Vase

Delivery:2nd Day FedEx From:Nature's Blooms

[FLOWERS] [DIRECT FROM GROWER] — 307

Superbatch Assortment — $44.95

Don't just give one bouquet, give a Superbatch! This vivid assortment of riotous color is actually five tremendous bunches of beautiful flowers and one enormous batch of greenery. That's enough flowers for every room in the house!

No two of these giant, field-of-flowers bouquets are exactly alike. It's the home decorator's dream come true. So many flowers, they won't know where to start! It's the largest assortment of four different flower varieties available at a wholesale price. Vase not included.

Delivery:2nd Day FedEx From:Flowers Direct from the Grower

[FLOWERS] [DIRECT FROM GROWER] — 307

1300

FIG. 23 http://homearts.pcflowers.com/o_bday.htm          PC Flowers & Gifts.Birthday Gifts

HomeArts Flowers & GIFTS
2116

214

SHOP BY OCCASION

Birthday Gifts

FTD Birthday Party Bouquet                $34.95

Start off any birthday celebration with a festive basket filled with colorful Carnations, Pompons, Daisies, Statice, Alstroemeria and greenery.

The FTD Birthday Bouquet comes complete with noisemakers and a Happy Birthday banner!

Delivery:FTD Select Florist From:FTD — 301

VIEW • ORDERING INFO
304

302 — [FLOWERS] [BOUQUETS] — 303

---

Royal Velvet Roses                $34.95-$74.95

If, as the poem suggests, your love is like a red, red Rose, only one flower will do: Royal Velvet. These are the big bright velvety red, cultivated Roses that open quickly to full bloom, then stay fresh longer than others. They're especially welcome when the wind blows cold, because they have the magical ability to brighten a mood and turn everything "rosy". Petals are flawlessly shaped, and your assortment is matched by hand. Stems are super long. Royal Velvet Roses are always in perfect taste, always correct, always delightful. Includes Twelve Long Stem Roses.

VIEW • ORDERING INFO
305

Vase Choices:No Vase, Crystal Mikasa Vase

Delivery:2nd Day FedEx From:Nature's Blooms

302 — [FLOWERS] [DIRECT FROM GROWER] — 307

---

Superbatch Assortment                $44.95

Don't just give one bouquet, give a Superbatch! This vivid assortment of riotous color is actually five tremendous bunches of beautiful flowers and one enormous batch of greenery. That's enough flowers for every room in the house!

VIEW • ORDERING INFO
306

No two of these giant, field-of-flowers bouquets are exactly alike. It's like home decorator's dream come true. So many flowers, they won't know where to start! It's the largest assortment of four different-flower varieties available at a wholesale price. Vase not included.

Delivery:2nd Day FedEx From:Flowers Direct from the Grower

302 — [FLOWERS] [DIRECT FROM GROWER] — 307

— 2300

FIG. 25 http://homearts.pcflowers.com/vendor03/balloons.htm    PC Flowers & Gifts:Balloons

HomeArts Flowers & GIFTS
2116
[SHOP BY CATEGORY]          214

Balloons

|VIEW • ORDERING INFO|  12 Latex Balloons                                                   $19.95
504                    Balloon bouquets make any festive occasion a celebration!
                       Choose latex balloons in a rainbow of colors for bouquets that last several hours.
                       Delivery:FTD Select Florist From:FTD
                       Some Suggested Occasions Include:                         ← 501
                       [BIRTHDAY] [ANNIVERSARY] [GET WELL] [ROMANTIC LOVE]
                       [THINKING OF YOU]

|VIEW • ORDERING INFO|  3 Mylar & 6 Latex Balloons                                          $24.95
505                    Balloon bouquets make any festive occasion a celebration!
                       Choose latex balloons in a rainbow of colors that last several hours and
                       shimmery printed mylar balloons that last a few weeks.
                       Mylar Balloon Choices:Baby Boy, Baby Girl, Congratulations,Get Well,
                       Happy Birthday, Happy Anniversary, I Love You, Thank You, Thinking of You
                       Delivery:FTD Select Florist From:FTD
                       Some Suggested Occasions Include:                         ← 502
                       [GET WELL] [BABY] [ROMANTIC LOVE] [THANK YOU] [THINKING OF YOU]
                       [BUSINESS]

|VIEW • ORDERING INFO|  8 Mylar Balloons                                                    $29.95
506                    Balloon bouquets make any festive occasion a celebration!
                       Choose shimmery printed mylar balloons for bouquets that last a few weeks.
                       Mylar Balloon Choices:Baby Boy, Baby Girl, Congratulations,Get Well,
                       Happy Birthday, Happy Anniversary, I Love You, Thank You, Thinking of You
                       Delivery:FTD Select Florist From:FTD
                       Some Suggested Occasions Include:                         ← 503
                       [BIRTHDAY] [ANNIVERSARY] [GET WELL] [ROMANTIC LOVE] [BUSINESS]

← 2500

FIG. 30 https://www.pcflowers.com/cgi-bin/
order.gen.cgi?121423-36448/redord3/

PC Flowers & Gifts: Order Form

HomeArts Flowers
& GIFTS
2116

Order Form                                    214

Personalization
Receiver's Name
Personalization Text
Closing
Sender's Name

Receiver Information
Name
Address1
Address2
City                               State ☐  Zip ☐
Daytime Phone

Sender Information
Name
Address1
Address2
City                               State ☐  Zip ☐
Daytime Phone It is imperative that we receive your E-mail address in order to
guarantee the successful processing of your order.

E-mail Address

Delivery Information
Delivery Date        ☐/☐/☐ (Month/Day/Year)
Special Instructions

Credit Card Information
⊙ MasterCard   ○ Visa    ○ American Express    ○ Discover
Cardholder's Name
Card Number
Expiration Date      ☐/☐ (Month/Year)
                                                    ↘ 3000
[ Place The Order ]

METHOD AND SYSTEM FOR CUSTOMIZING MARKETING SERVICES ON NETWORKS COMMUNICATING WITH HYPERTEXT TAGGING CONVENTIONS

The present application claims benefit of U.S. patent application Ser. No. 09/563,352 filed May 3, 2000 now abandoned, which is a continuation of U.S. patent application Ser. No. 08/785,321 filed Jan. 21, 1997 now U.S. Pat. No. 6,141,666, which claims benefit of U.S. Provisional Application Nos. 60/017,229 filed May 9, 1996 and 60/010,372 filed Jan. 22, 1996.

FIELD OF THE INVENTION

The invention relates generally to computer based client/server communications, and more particularly, to dynamically customizing the content on server Web site pages in response to distinct classes of clients for hypertext tagging based communications on a network.

BACKGROUND OF THE INVENTION

The NET or Internet, as is commonly referred to, is basically a network of various types of computers, connected over telecommunication lines, communicating with each other through a protocol known as Transmission Control Protocol/Internet Protocol (TCP/IP) for the purpose of exchanging information. Being "connected to the Internet" can mean anything from sending a simple message to a colleague across the state, to logging into another computer halfway around the world to search and retrieve text, graphics, sounds and even movies. Accessing the Internet requires a computer which has TCP/IP communication capabilities and is physically connected to the Internet with an identifiable Internet address. Many Internet service providers, such as Prodigy, America On Line, and CompuServe, offer access to the Internet through their TCP/IP compatible UNIX computers already connected to the Internet. A subscriber to one of these service providers need only have a personal computer and modem to make a telecommunication connection to the service provider's UNIX computer.

Various information exchanges on the Internet are available through functions such as electronic message exchange (E-mail) and File Transfer Protocol (FTP or ftp.). Electronic mail is a service that allows two people to send messages to each other in a near real time manner. Messages can be sent to one address or multiple addresses. E-mail can also be used to retrieve documents from other computers on the Internet. FTP refers to moving files from one place to another on the Internet. The files may contain electronic documents, images, sounds, etc. Anything stored on the computer can be moved with FTP.

In recent years, a new mode of navigating through the Internet called the World Wide Web (WWW) has emerged which provides a hypertext interface to information on the Internet. The WWW uses the client-server model of computer interaction, with the server being a computer on the Internet providing information, and the client being a computer retrieving the information. The normal way to navigate through the Internet is by moving through directory trees of information, whereby moving from node to node requires providing an address for each node. Likewise if the nodes are Internet sites, computers on the Internet, movement from one site to another requires providing an address for each site. In contrast, with the hypertext interface information can be stored and retrieved in a nonhierarchical structure. In essence, one can "jump" from one place of information on the Internet to another through a series of "hypertext links" created by someone. A hypertext link can literally allow one to simply select a word, using a mouse or key command, and immediately be transported to another document on the Internet halfway around the world.

In a hypertext interface all the technical aspects of moving from computer to computer are hidden, leaving the client free to explore without interference. Communication through the WWW function is by a HyperText Transport Protocol (HTTP) which uses a HyperText Markup Language (HTML). The HTML uses Uniform Resource Locators (URLs), which are a way of specifying the location of something on the Internet, to make the hypertext links. A standard form of URL address for accessing a particular word 26 marked by HTML, in a chapter called Web-chapter, in a book stored on a hard drive in a WWW server is: http://dgf21.xpr.cs.wwu/book/Web-chapter.html#word 26. The http connection at the beginning identifies this address to the Internet as a WWW server.

Access to the WWW requires a software tool typically referred to as a client or browser, which is installed on the computer used to access the Internet, or installed on an Internet service provider's computer on the Internet that offers access to the WWW browser. Browsers may be text based line browsers or, graphical based browsers such as Mosaic or Netscape.

The Internet is being increasingly used for commerce by companies, with Internet sites or services, providing opportunities to consumers to make purchases. In addition to automated secured transactions, commerce on the Internet requires development of software based marketing tools unique to the Internet structure. Typically, when a client's Web browser points to another Web server via a hypertext link, the URL address of the Web server will display the address of the transferee Internet site that the Web browser will jump to if the hypertext link transfer is executed. As a result, consumers may feel a reluctance to conduct transactions through a transferee Internet site they have not directly signed on with, have not had a long standing relationship with, or have not developed a comfort level with the transferee Internet site's label, brand and Web site content.

Accordingly, there is a need for customized marketing of consumer services through hypertext based communications wherein the content of the hypertext based communications is dynamically customized to take advantage of a consumer's existing familiarity with a specific Internet site marketing partner.

SUMMARY OF THE INVENTION

The present invention is a server based communications system operable in a network environment. The system employs a server software tool for presenting HTML tagged information which is customized according to a particular class to which a client, accessing the system, belongs to. The class of the client may be clients referred to the system by a particular network site. The system also includes a database responsive to the server which dynamically retrieves data stored on the system, in accordance with stored requirements which define the customization for the particular class of clients, to provide customized content on HTML documents. Lastly, the system includes a processing subsystem for manipulating the server and database software tools in response to the HTML tagged requests from the client.

Preferably, the server software tool is a Netscape Commerce Server which responds to hypertext protocol and tagging conventions such as HTTP and HTML. Preferably, the database software operating in conjunction with the server software tool is a commercially available database tool, known as RDBMS, which is produced by Oracle software company. It is understood that other commercially available web server and database software tools may be employed as described herein within the scope and intent of the present invention.

In accordance with the present invention the server based communications system is utilized to market consumer services, such as floral and gift services, via HTML documents presented to a client that has accessed the system by referral from another network site. The referral network site can be a partner participating with the host of the server based communications system or a participant seeking to utilize the server based communications to develop its own marketing position.

The system presents HTML documents which contain hypertext links, presented as single links or image maps, i.e., grouped links, which are anchored to data that is dynamically retrieved by the database means in response to the particular class to which the client belongs to, i.e., based on the identity of the network site referring the client to the system's server. Such a dynamic retrieval of data facilitates dynamic configuration of content on all anchored HTML documents so as to meet specific requirements of a marketing participant. Customization can be either a co-branded format, whereby content includes both the host's brand name and the participant's brand name, or a private label format, whereby only the marketing participant's brand name is displayed on the HTML documents presented to clients.

The present invention employs a dynamic tokening scheme whereby a token, indicative of the identity of the referring network site, is passed between successive HTML documents so as to track the necessary customization requirements for all HTML documents presented to the client. This dynamic tokening scheme relies on software executables including tokening.cgi and track.cgi, and markup tags such as PORT#, URL, and IMAGEMAP.

The server based communications system provides a participating vendor with the ability to supply the system with HTML documents wherein the vendor has access into the system for control over the HTML documents supplied by the vendor. Moreover, the vendor has the ability to transfer HTML documents pertaining to product data, and receiving from the system encrypted files containing orders.

The server based communications system can be operated in an Internet environment or an Intranet environment where hypertext protocol and tagging conventions are utilized for communications between a client and server. The Intranet environment can be localized to an America Online group of clients designated as Digital City, or a geographic area, or a corporate grouping of employees. In either type of locality, the system can customize the content on HTML documents presented in the Intranet environment in accordance with the specific requirements of the localized Intranet group.

BRIEF DESCRIPTION OF THE DRAWINGS

The invention will be better understood with reference to the following illustrative and non-limiting drawings, wherein like graphic elements or features are like numbered, in which:

FIG. 3 is a PC Flowers & Gifts Web site page, birthday gifts, accessible via a hypertext link from the Web site page depicted in FIG. 2.

FIG. 5 is a PC Flowers & Gifts Web site page, balloons, accessible via a hypertext link from the Web site page depicted in FIG. 4.

FIG. 10 is a PC Flowers & Gifts Web site page, order form, accessible via a hypertext link from the Web site page depicted in FIG. 9.

FIGS. 11C-20 show co-branded Web site pages that correlate to the PC Flowers & Gifts Web site pages depicted in FIGS. 1C-10 which are customized with both the PC Flowers & Gifts and Pathfinder brands.

FIGS. 21C-30 show private label Web site pages that correlate to the PC Flowers & Gifts Web site pages depicted in FIGS. 1C-10 which are customized solely with the Homearts brand.

DETAILED DESCRIPTION OF THE INVENTION

Figure 1A:
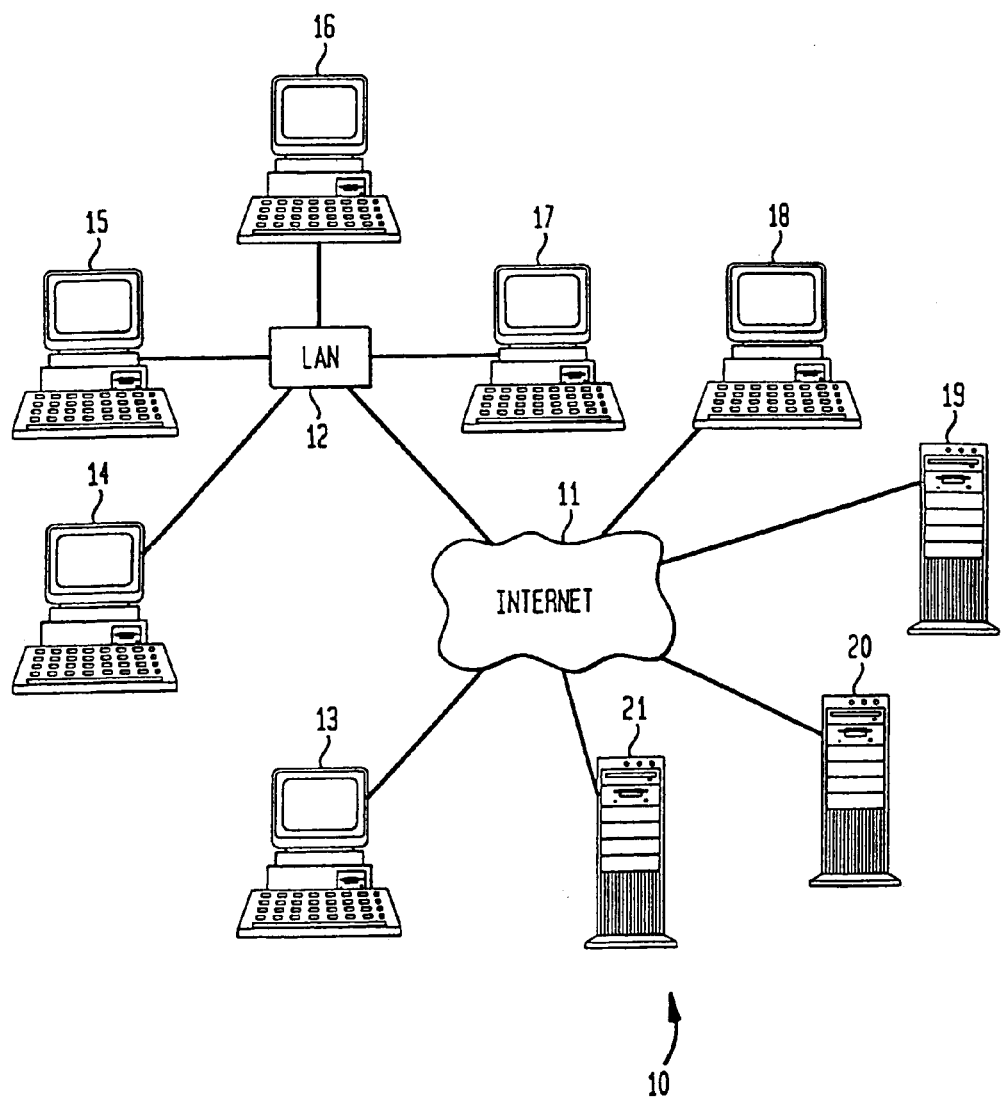
FIG. 1A is a schematic of a typical communications network including single client stations, a local area network (LAN) of client stations and servers interconnected across the Internet.

Although the present invention can be used in many applications which can utilize customization marketing tools unique to client/server communications across a variety of communication network structures, the present invention is described in its application to PC Flowers & Gifts, an Internet site providing floral and gift services through Web site pages which are dynamically customized to the requirements of other Internet sites referring clients, i.e., consumers, to the PC Flowers & Gifts Web site pages. Accordingly, the present invention will be described in its application to the PC Flowers & Gifts Internet based marketing program whereby participating Internet Service providers or Web sites display PC Flowers & Gifts Web site pages customized to the requirements of the participating Internet Service provider or Web site.

The PC Flowers & Gifts marketing program comprising the floral and gift Web site pages are dynamically customized in accordance with the participating Internet site's requirements which may be co-branded, private label or, a program of labeling unique to the participating Web site. More specifically, the PC Flowers & Gifts Web site pages are customized in both a graphic and a content format to take advantage of the consumer's familiarity with the participating Internet site's position in the marketplace, the consumer's trust in the participating Internet site's established brand name, or the consumer's existing relationship with the participating Web site.

Marketing on the Internet presents problems as to how to customize the participating Web sites marketing services to take advantage of an established market presence on the Internet. Typically, when browsing on a Web site which is pointing to a Web server, the URL of the Web server appears, rather than the URL of the pointing Web site, which clearly indicates that the consumer will be dealing with a different Internet site, possibly an Internet site the consumer is unfamiliar with. Moreover, a method is needed whereby the identity of an Internet site participating in the marketing program or, an Internet site referring a client or user to the PC Flowers & Gifts Web site, is tracked. The automatic tracking of the participating or referring Internet sites is crucial to transparently customizing Web site pages to take advantage of brand name recognition and customer loyalty.

To resolve the problem of dynamic customization of Internet sites participating in the PC Flowers & Gifts program of marketing services, PC Flowers & Gifts has completely redesigned its Web site pages to be extremely user friendly and its hypertext links to be configured in a database format. The database format of hypertext links enables development of "private label" and "co-branded" floral and gift services that can be customized for many of the major Web sites on the Internet and online services. For, example, if a consumer were to visit one of the private label floral and gift services home page of the Internet site "Homearts", all the graphics and product categories on each of the PC Flowers & Gifts Web site pages, available through a hypertext link from a Homearts Web site, are fully customized in graphic and content format to reflect only the Homearts brand name. As another example, all the graphics and product categories on each of the PC Flowers & Gifts Web site pages, available through a hypertext link from a Pathfinder Web site, are partially customized in graphic and content format to reflect both the PC Flowers & Gifts and Pathfinder brand names. This unique database format of server files accessed through the hypertext links permits a participating Internet site to host floral and gift services so as to take advantage of the consumer's familiarity with the participating Internet site.

The advantages of a floral and gift service customized to the various participating Web sites and online services are among the following: building the brand name and identity of participant's own floral and gift service; taking advantage of the event driven nature of the floral and gift business on a monthly basis to promote the participant's own site and to generate traffic; and, utilizing the content of the PC Flowers & Gifts floral and gift service to the participant's own marketing advantages. In addition, the participating Web sites and online services can utilize the unique capabilities of the PC Flowers & Gifts service such as the email gift reminder service, which is part of the content of the PC Flowers & Gifts service, in order to develop a close relationship with their consumers and gain permission to enter the consumer's mailbox in order to place reminders of various upcoming gift events.

Referring now to FIG. 1A there is shown a schematic of a typical communications network 10 including single client stations 13 and 18, a local area network (LAN) 12 of client stations 14, 15, 16 and 17, and servers 19, 20, and 21 interconnected across the Internet 11. A client station may directly transfer into a server or be pointed to one server by another server. More specifically, assuming for the sake of explanation that server 21 is the PC Flowers & Gifts Web server, the clients may directly transfer across the Internet 11 and communicate with the Web server 21, or the clients may initially transfer across the Internet 11 and communicate with server 19 which provides a hypertext link to server 21. It is noted that via the hypertext links on server 19, the client attains the IP address to server 21 and the Web site location on the Web server residing in server 21.

Figure 1B:
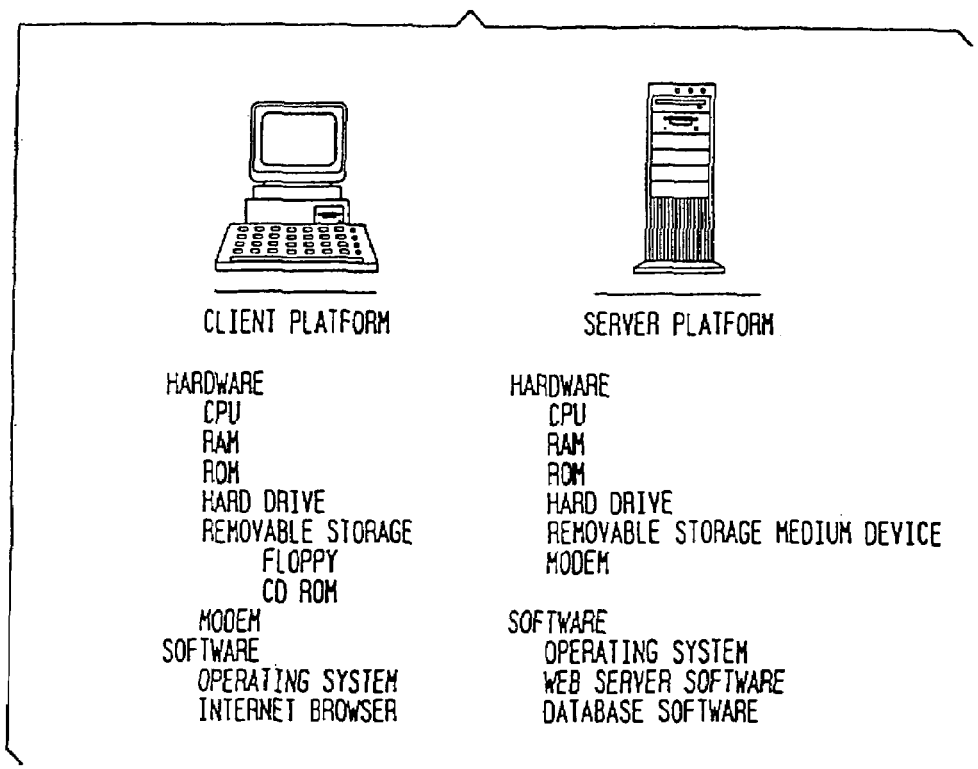
FIG. 1B is tabular display of typical hardware elements for a client and a server, and respective software elements which configure the hardware elements.

Referring now to FIG. 1B, there is shown a tabular display of typical hardware elements for a client and a server, and respective software elements which configure the hardware elements for operation in accordance with the present invention. A typical client platform includes hardware such as a central processing unit (CPU), e.g. a Pentium microprocessor, RAM, ROM, hard drive storage, modem, and optional removable storage devices such as a floppy drive or a CD ROM drive. The client hardware is configured by software including an operating system, e.g. Windows 95 or NT, and an Internet browser such as Netscape's "Navigator" or Microsoft's "Internet Explorer". A typical server platform includes hardware such as a CPU, e.g. Pentium microprocessor, RAM, ROM, hard drive, modem, and optional removable storage devices, e.g., floppy or CD ROM drive. The server hardware is configured by software including an operating system, e.g. Windows 95 or NT, Web server software, e.g., Netscape Commerce Server, and database software, e.g., Oracle RDBMS.

Non Customized Web Site Pages

Figure 1C:
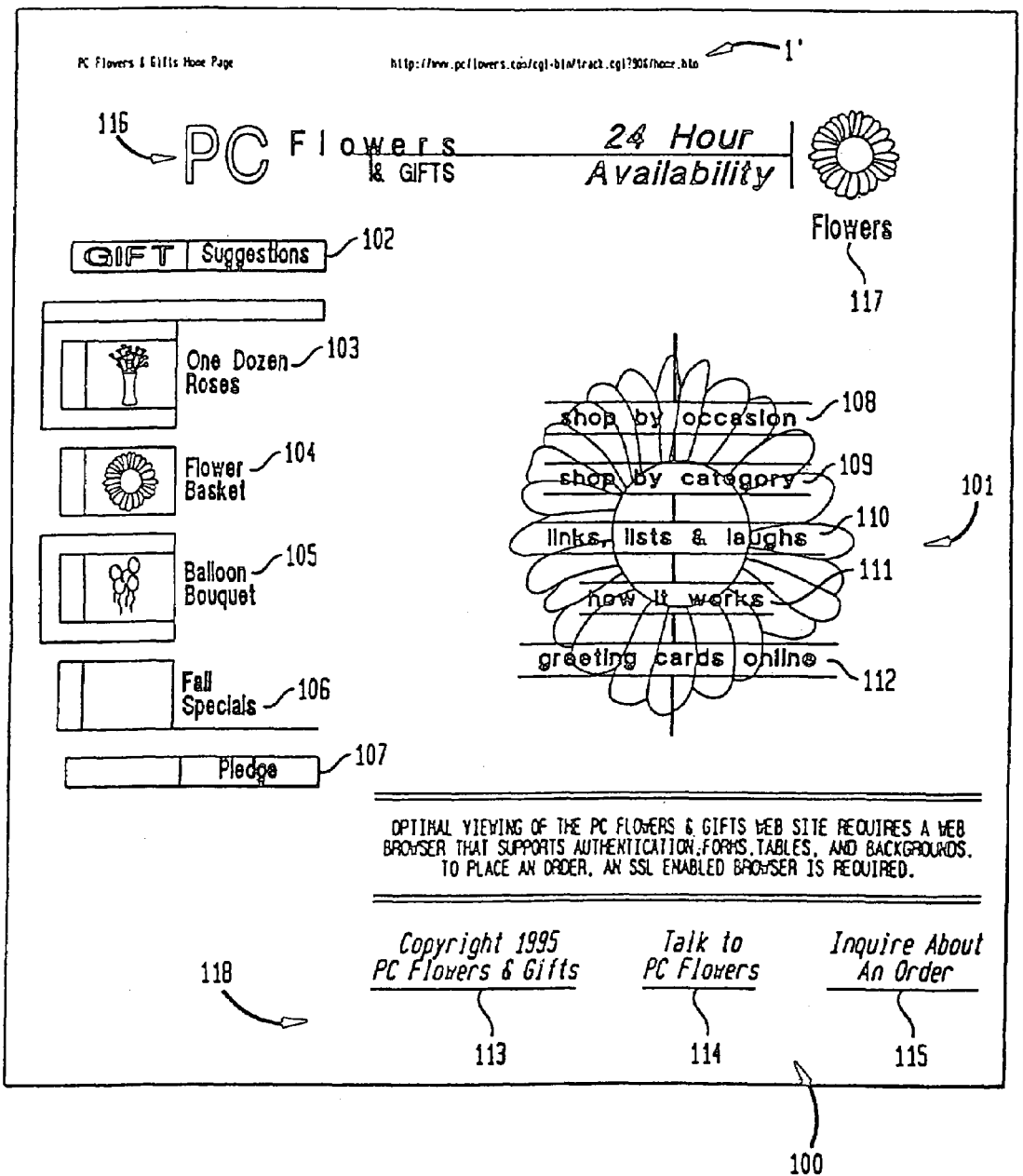
FIG. 1C is a PC Flowers & Gifts home page Web site providing Internet consumers a variety of floral and gift purchasing opportunities through hyper graphic or text based links.

Referring now to FIG. 1C there is shown a PC Flowers & Gifts home page Web site page 100 providing Internet consumers a variety of floral and gift purchasing opportunities through graphic based hypertext links. It is noted that the references to Web site page(s) and HTML document are used interchangeably in the art and herein. The graphic link 102 provides a jump to a Web site page detailing gift suggestions while links 103 to 106 provide jumps to Web site pages detailing specific gift offerings. Essentially, these links 103 to 106 are anchored to database server files which are called up by the server to form Web site pages that are customized to the requirements of any participating Internet site. Link 107 provides a jump to a Web site page disclosing a pledge of quality of service and, the footer 118 includes link hypertext link 113, a copyright notice, hypertext link 114, a "Talk To PC Flowers" link, and hypertext link 115, an inquiry link. The flower link 117 is a link to a "shop by occasion" Web site page which is also accessible through link 109. It is noted that the header 116 is solely a PC Flowers & Gifts label which indicates that the client has accessed the Web site page 100 without any hypertext links through a participating Web site requiring 'private label" or "co-branded" customizing, more fully discussed with respect to FIGS. 11C-20 and 21C-30.

A key feature of the present invention involves the image map 101 which is a grouping of hypertext links 108-112. Hypertext links 108-112 provide jumps to Web site pages indicated, respectively, as "shop by occasion", "shop by category", "links, lists and laughs", "how it works", and "greeting cards". Essentially the hypertext links contain anchors to web site pages which are created from combinations of server files. For customizing web site pages which the hypertext links are anchored to, in accordance with the present invention, a database process is used to access different combinations of files for configuring the customized content on the web site pages the client or user eventually sees when a hypertext link is executed. The image map 101 entails two components, the client's xy coordinate pointer position and the matching of server database files as discussed above. The server calls out appropriate database files to configure the eventual web site page displayed, such as web site page 200. The database files called out depends on variables such as a particular vendor, date, particular occasion, etc.

Figure 2:
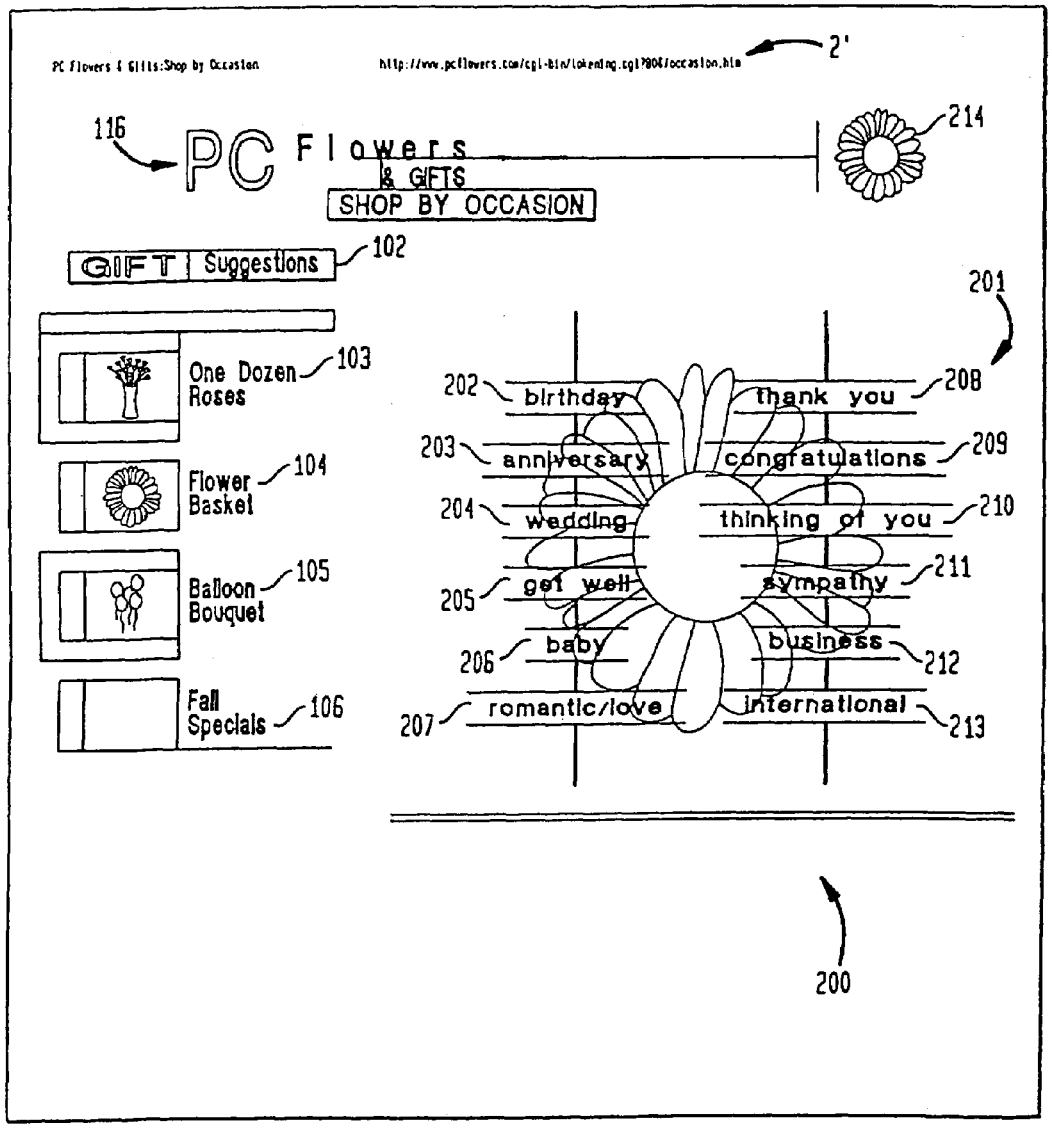
FIG. 2 is a PC Flowers & Gifts Web site page, shop by occasion, accessible via a hypertext link from the home page Web site depicted in FIG. 1.

Referring now to FIG. 2 there is shown a PC Flowers & Gifts Web site page 200, denoted as "shop by occasion", accessible via the hypertext link 108 from the home page Web site 100 depicted in FIG. 1. The Web site page 200 contains an occasion map 201 which includes hypertext links 202 through 213 which provide jumps to Web site pages indicated, respectively, as "birthday", "anniversary", "wedding", "get well", "baby", "romantic/love", "thank you", "congratulations", "thinking of you", "sympathy", "business", and "international". For the occasion map 201, like the home page image map 101, a database process is used to dynamically select the files used to configure a Web site page that a particular hypertext link points to. Also on the Web site page 200 is a sun flower 214 which is a hypertext link to the home page 100.

Figure 4:
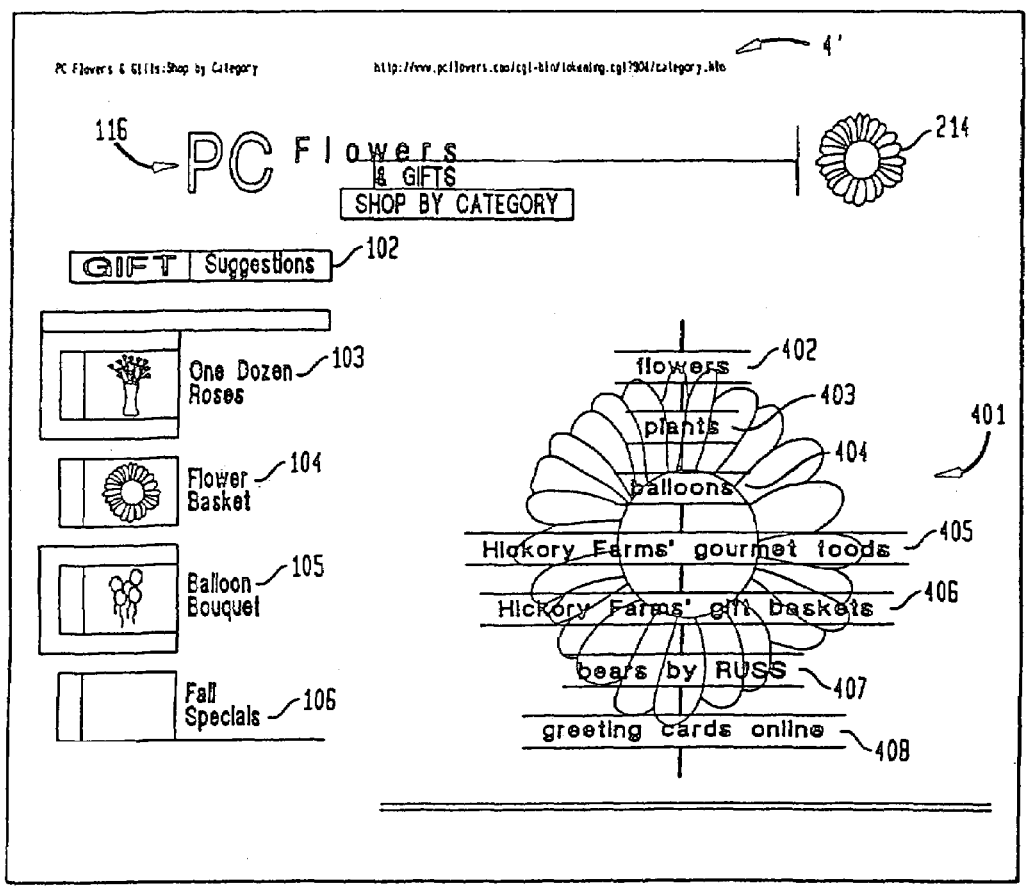
FIG. 4 is a PC Flowers & Gifts Web site page, shop by category, accessible via a hypertext link from the home page Web site depicted in FIG. 1.

Referring now to FIG. 4 there is shown a PC Flowers & Gifts Web site page 400, denoted as "shop by category", accessible via a hypertext link 109 from the home page Web site 100 depicted in FIG. 1. The distinguishing content on this Web site page 400 is that the category image map 401 includes hypertext links 402-408 which provide jumps to Web site pages indicated, respectively, as "flowers", "plants", "balloons", "Hickory Farms gourmet foods", "bears by Russ", and "greeting cards online". As noted for the discussion pertaining to the home page image map 101, the category image map 401 includes hypertext links which point to Web site pages that are dynamically created as needed by a database process.

Referring now to FIG. 4 there is shown a PC Flowers & Gifts Web site page 400, denoted as "shop by category", accessible via a hypertext link 109 from the home page Web site 100 depicted in FIG. 1. The distinguishing content on this Web site page 400 is that the category image map 401 includes hypertext links 402-408 which provide jumps to Web site pages indicated, respectively, as "flowers", "plants", "balloons", "Hickory Farms gourmet foods", "bears by Russ", and "greeting cards on-line. As noted for the discussion pertaining to the home page image map 101, the category image map 401 includes hypertext links which point to Web site pages that are dynamically created as needed by a database process.

Referring now to FIG. 5, there is shown a PC Flowers & Gifts Web site page 500, denoted as "balloons", accessible via a hypertext link 404 from the Web site page 400 depicted in FIG. 4. Web site pages detailing some suggested occasions for purchasing varieties are available through hypertext link groupings 501 through 503. Hypertext links 504 through 506 provide jumps to Web site pages providing a more detailed view of product options and associated ordering information.

Figure 6:
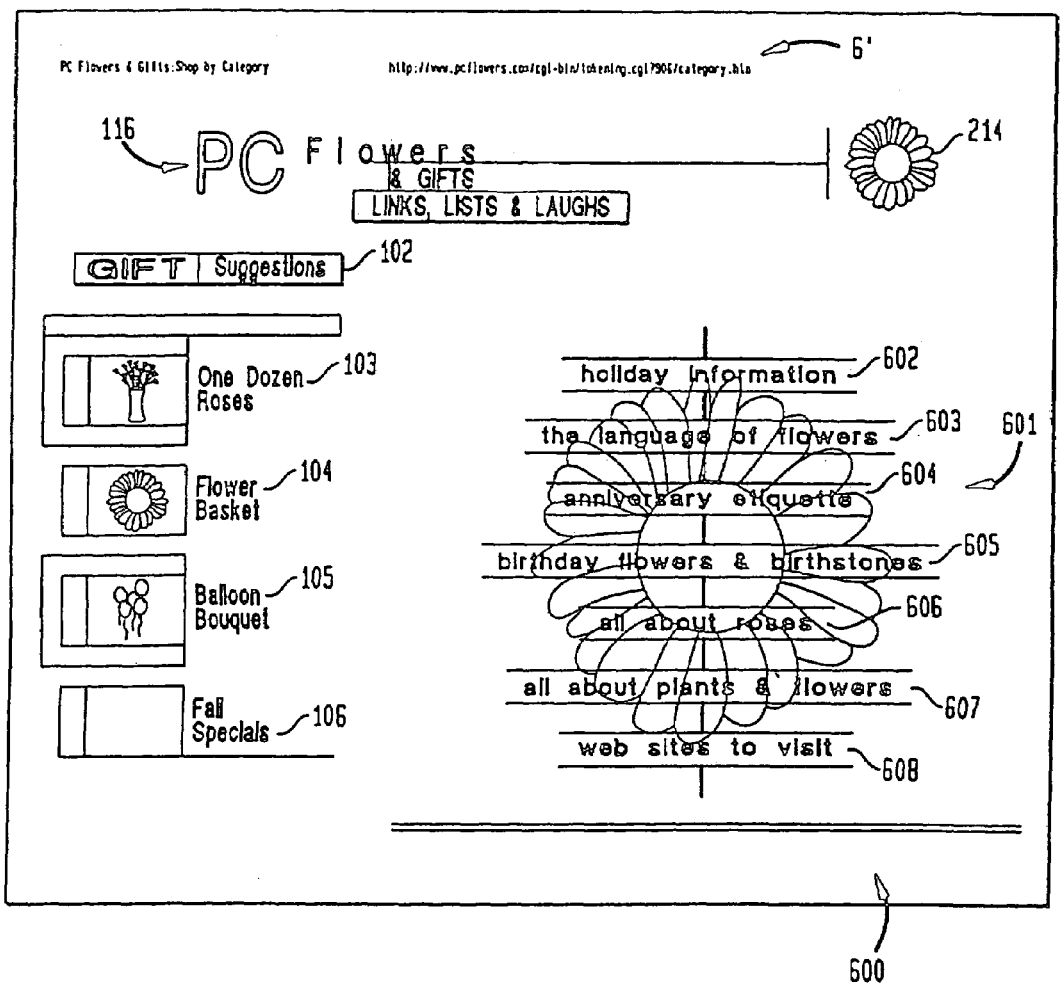
FIG. 6 is a PC Flowers & Gifts Web site page, link, lists, and laughs, accessible via a hypertext link from the home page Web site depicted in FIG. 1.

Referring now to FIG. 6, there is shown a PC Flowers & Gifts Web site page 600, denoted as "link, lists, and laughs", accessible via a hypertext link 110 from the home page Web site depicted in FIG. 1. The distinguishing content on this Web site page 600 is that the links, lists, and laughs map 601, which includes hypertext links 602-608, provide jumps to Web site pages indicated, respectively, as "holiday information", "the language of flowers", "anniversary etiquette", "birthday flowers & birthstones", "all about roses", "all about plants & flowers", and "web sites to visit". As noted for the discussion pertaining to the home page image map 101, the hypertext "links of the lists and laughs" image map 601 points to web site pages which are dynamically created by a database process retrieving appropriate server files.

Figure 7:
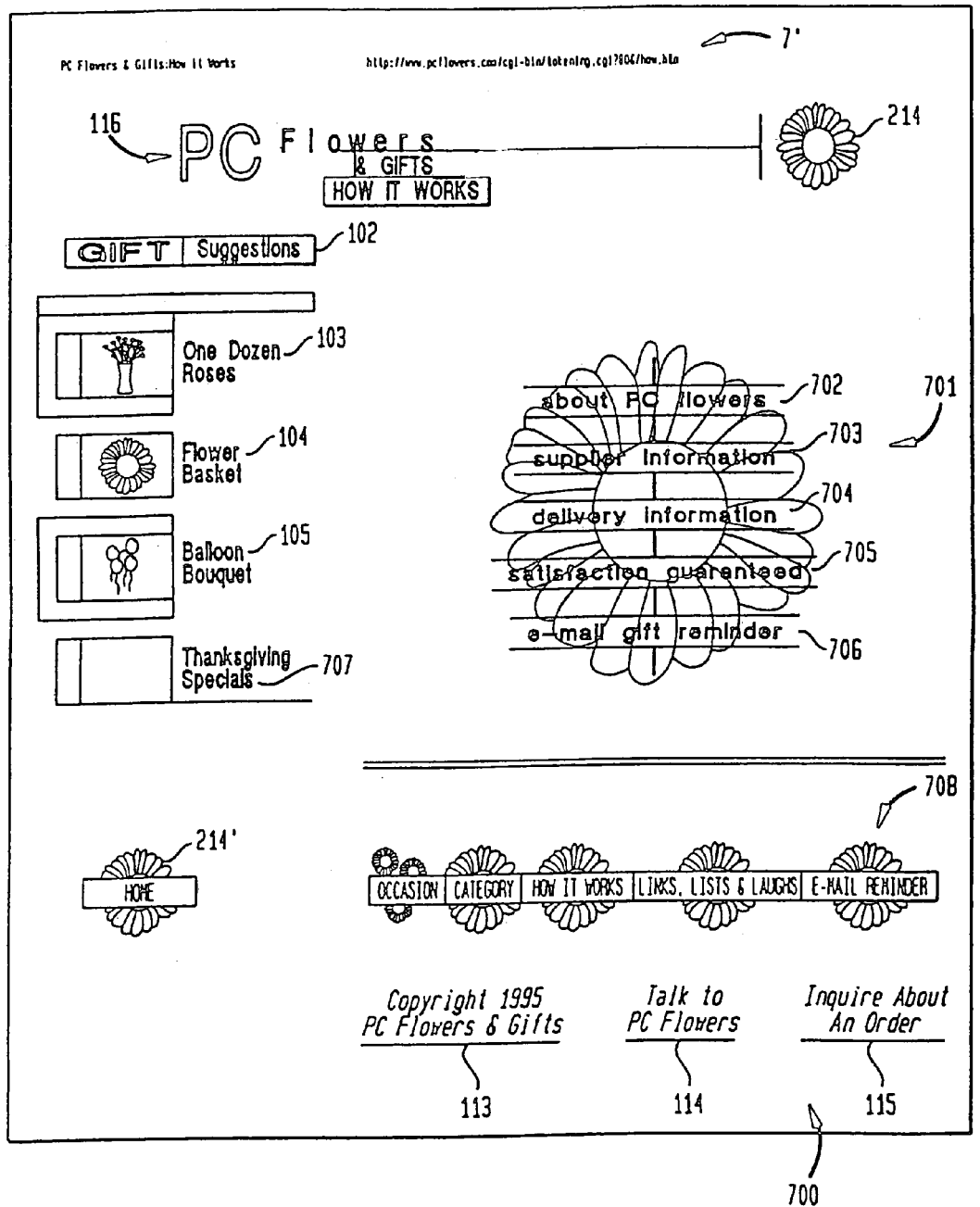
FIG. 7 is a PC Flowers & Gifts Web site page, how it works, accessible via a hypertext link from the home page Web site depicted in FIG. 1.

Referring now to FIG. 7, there is shown a PC Flowers & Gifts Web site page 700, how it works, accessible via a hypertext link 111 from the home page Web site page 100 depicted in FIG. 1. The distinguishing content on this Web site page 700 is the "how it works" image map 701 which includes hypertext links 702-708 which provide jumps to Web site pages indicated, respectively, as "about PC Flowers", "supplier information", "delivery information", "satisfaction guaranteed", and "e-mail gift reminders". As noted for the discussion pertaining to the home page image map 101, the hypertext links of the "how it works" image map 701 point to web site pages that are dynamically created. The Web site page 700 also contains a hypertext link 707 to a Web site page offering Thanksgiving specials and a grouping of hypertext links 708 providing jumps to the same Web site pages as the home image map 101. Also on the Web site page 700 is a sun flower 214'.

Figure 8:
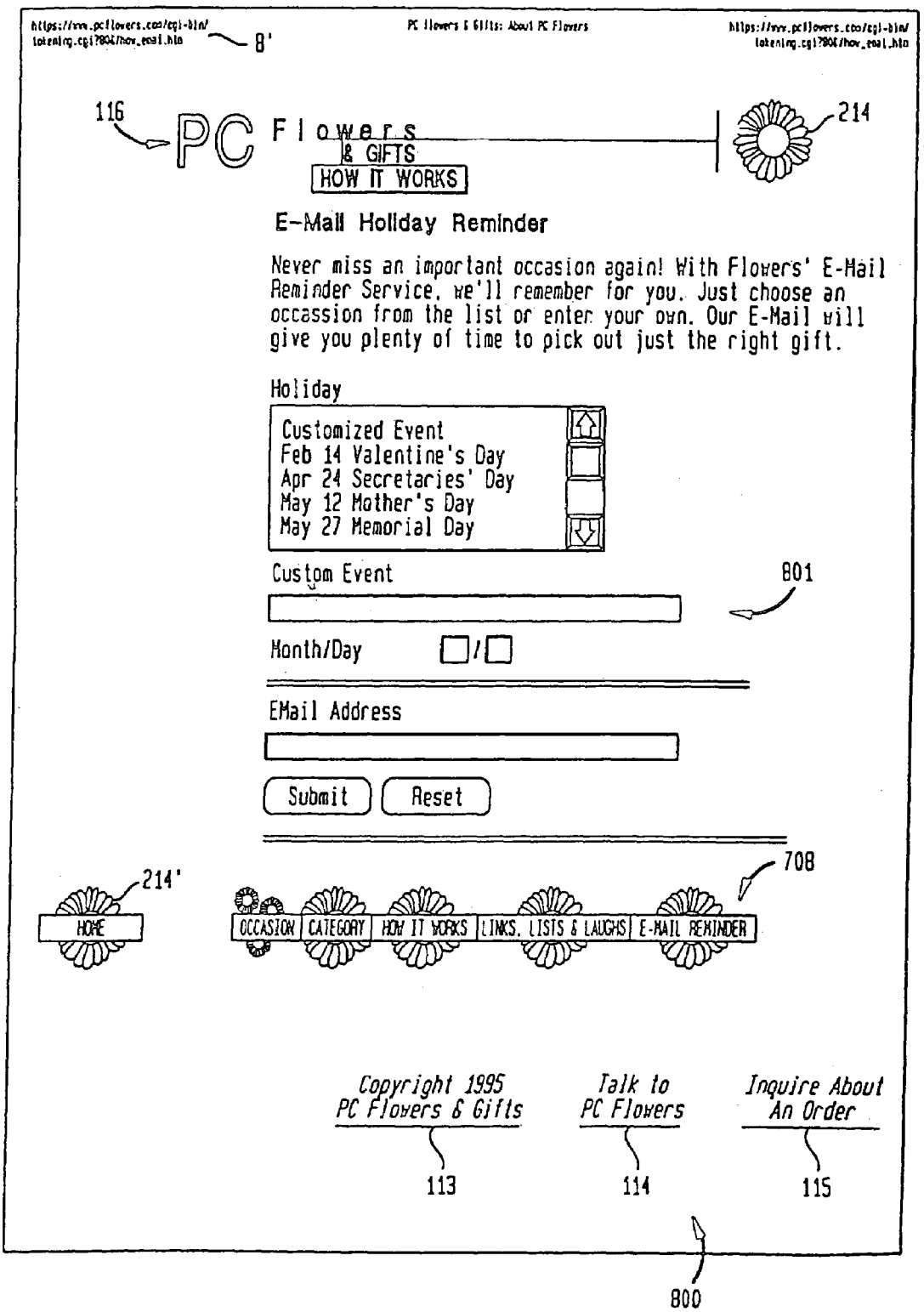
FIG. 8 is a PC Flowers & Gifts Web site page, e-mail holiday reminder, accessible via a hypertext link from the Web site page depicted in FIG. 7.

Referring now to FIG. 8 there is shown a PC Flowers & Gifts Web site page 800, denoted as an e-mail holiday reminder, accessible via a hypertext link 706 from the Web site page depicted in FIG. 7. The Web site page 800 affords potential clients, i.e., Web browser users, an opportunity to provide their e-mail address and request that a gift reminder be sent to that e-mail address prior to one of many holidays or a custom event such as an anniversary, birthday, or special event 801. The e-mail holiday marketing program 801 is unique in that clients provide personal information, i.e., email addresses, and allow the server to automatically direct marketing based content to the personal e-mail address provided by the client or user.

Figure 9:
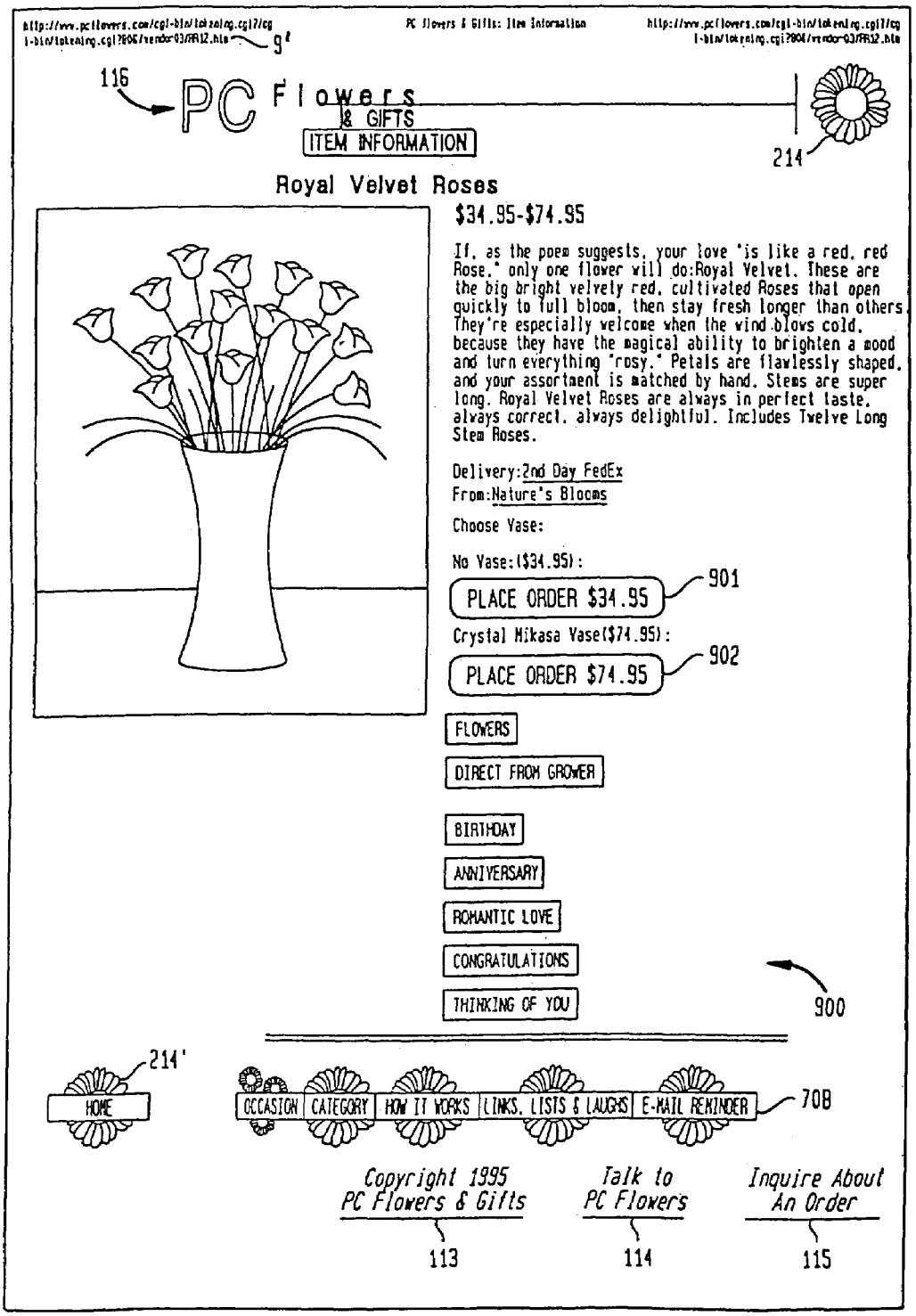
FIG. 9 is a PC Flowers & Gifts Web site page, item information, accessible via a hypertext link from the home page depicted in FIG. 1 or the Web site page depicted in FIG. 3.

Referring now to FIG. 9, there is shown a PC Flowers & Gifts Web site page 900, denoted as item information, accessible via a hypertext link 111 on the home page depicted in FIG. 1 or the hypertext link 305 on the Web site page depicted in FIG. 3. A client is afforded an opportunity to view the product, herein a dozen long stem roses, and ordering options without a vase, and with a crystal vase, each option being represented as hypertext links 901 and 902, respectively. Executing a jump under one of the hypertext links 901 or 902 leads the client to Web site page 1001, denoted as order form and shown in FIG. 10. The Web server tracks the particular product being ordered by the particular hypertext link 901 or 902 that the client jumps from onto the order form Web site page 1001. It is noted that encryption is employed respecting transmission of sensitive information transmitted across the Internet. The details of the encryption and exchange of ordering information with vendors offering goods and services is further discussed in greater detail herein below.

Co-Branded Customization

Figure 11A:
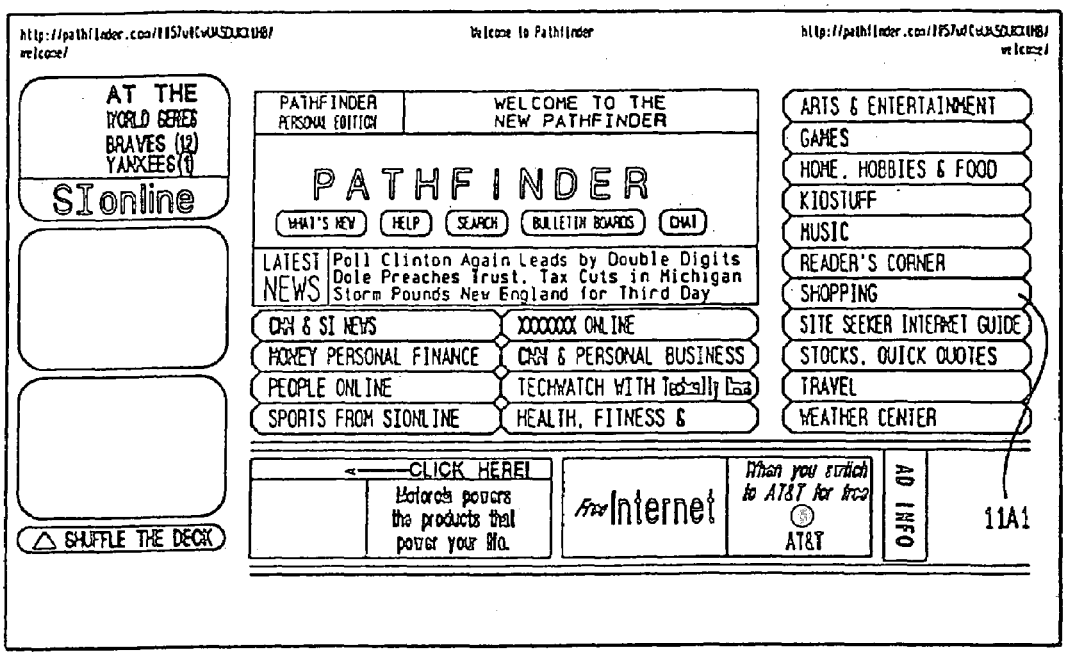
FIG. 11A is a Web site page of a marketing co-partner, Pathfinder.
Figure 11B:
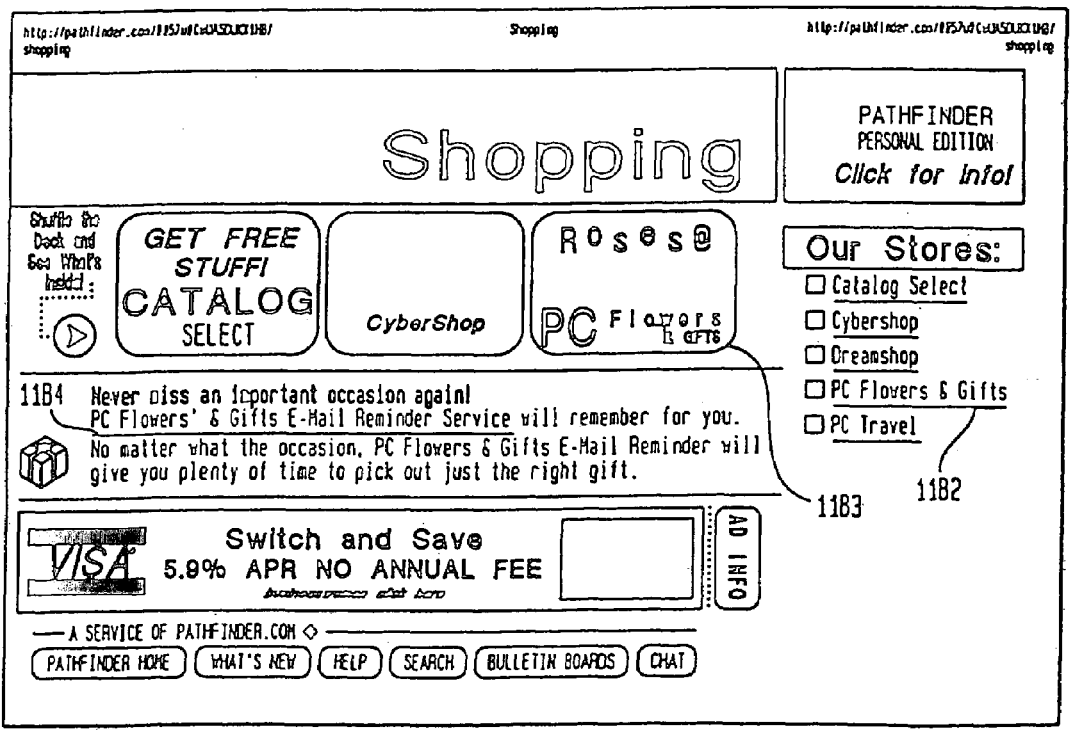
FIG. 11B is a Pathfinder Web site page which is accessible via a hypertext link from the Web site page depicted in FIG. 11A.

Referring now to FIG. 11A there is shown a Web site page 11A0 of a marketing co-partner, Pathfinder. A hypertext link 11A1 provides a jump to a Web site page 11B0, shown in FIG. 11B, which provides shopping opportunities to the client. The Web site page 11B0 contains hypertext links, 11B2, 11B3, and 11B4, which provide jumps to Web site pages, related to the PC Flowers and Gifts marketing program for floral and gift services, which are co-branded with the participating Web site partner, in this instance Pathfinder.

FIGS. 11C-20 show co-branded Web site pages that correlate to the PC Flowers & Gifts Web site pages depicted in FIGS. 1C-10. The Web site pages of FIGS. 11C-20 are customized with both the PC Flowers & Gifts and the marketing partner's brand, Pathfinder. Referring to the Web site page 1100, shown in FIG. 11C, the header 1116 is a modified version of header 116 with the additional pathfinder label 1116'. In addition, the client's familiarity with the marketing partner's brand is reinforced through the retention of the marketing partner's navigational features via the hypertext link grouping 1102. The modified header 1116 with the pathfinder co-brand 1116' is shown on Web site pages 1200, 1300, 1400, 1500, 1600, 1700, 1800, 1900 and 2000. In addition, the navigational features 1102 of the marketing partner is utilized on Web site pages 1800 and 1900.

Figure 11C:
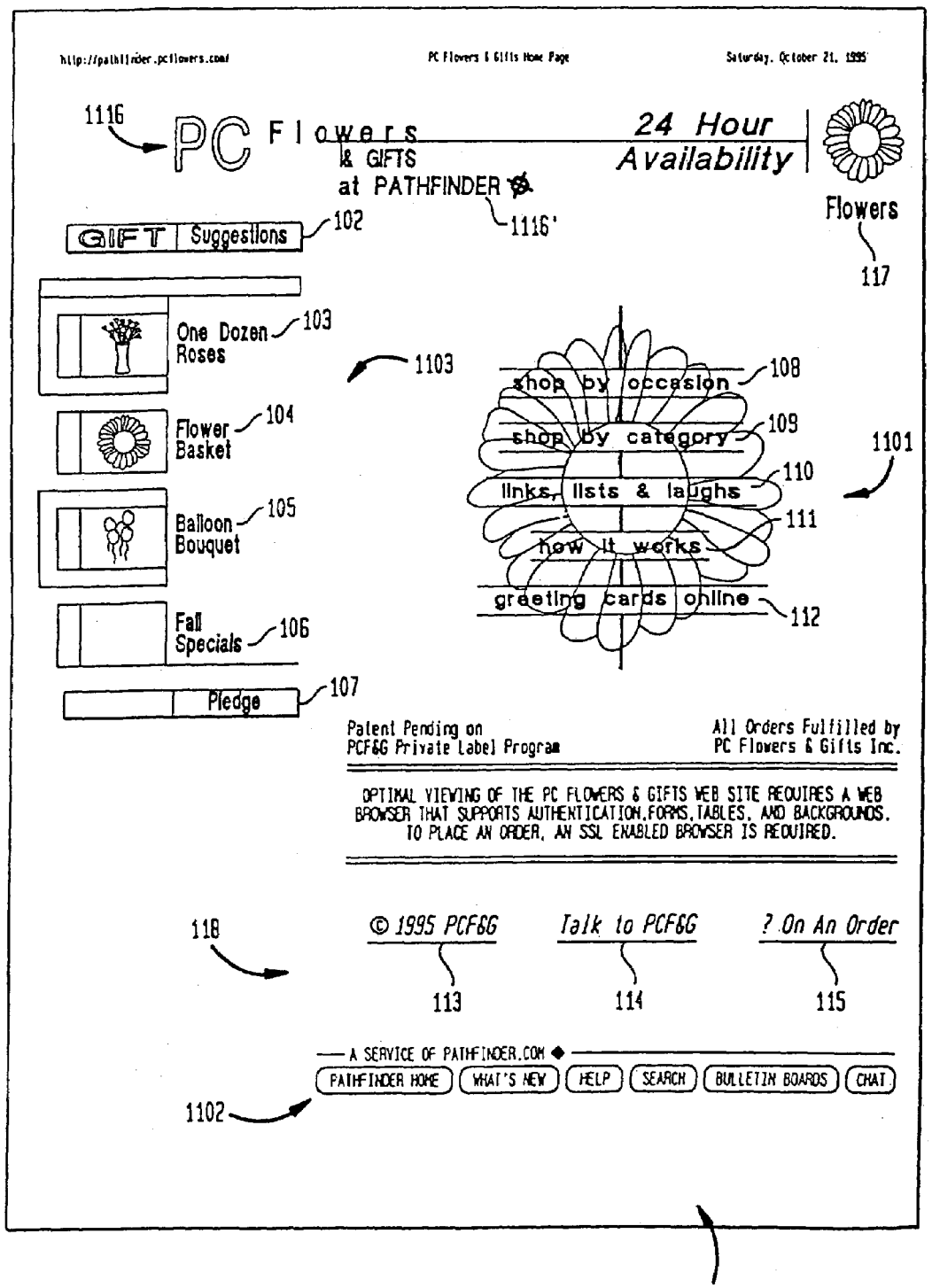
Figure 12:
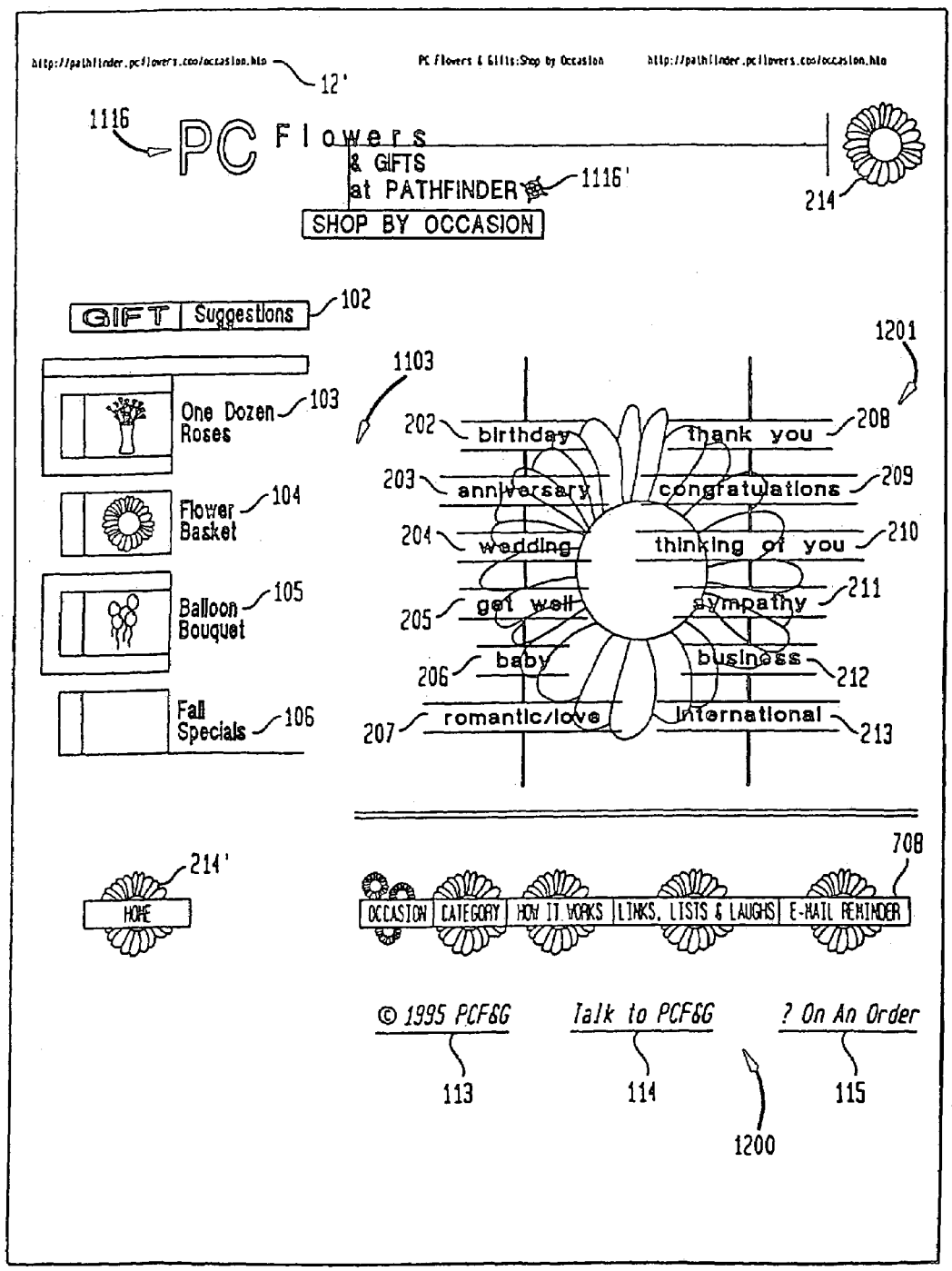
Figure 14:
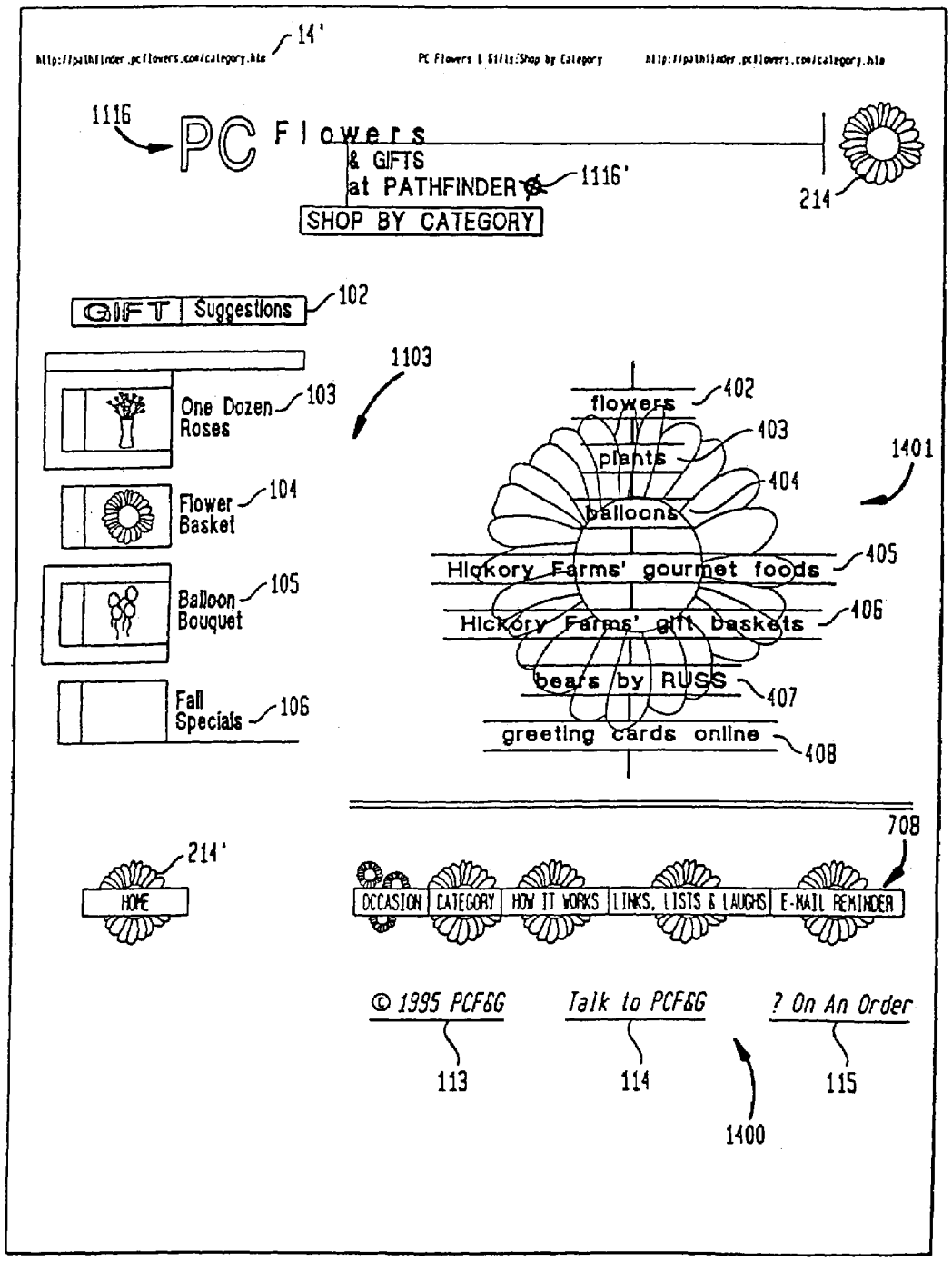
Figure 15:
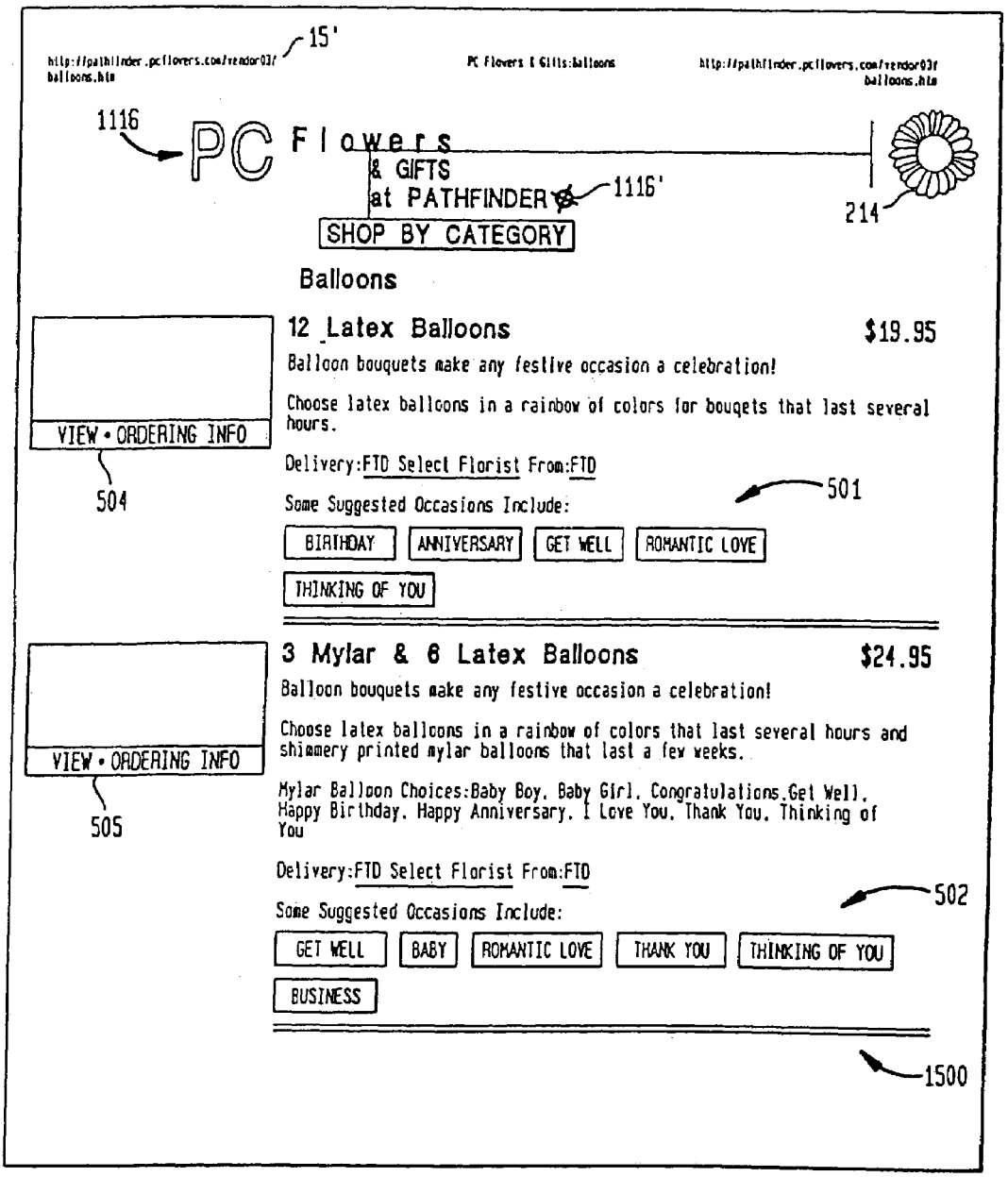
Figure 16:
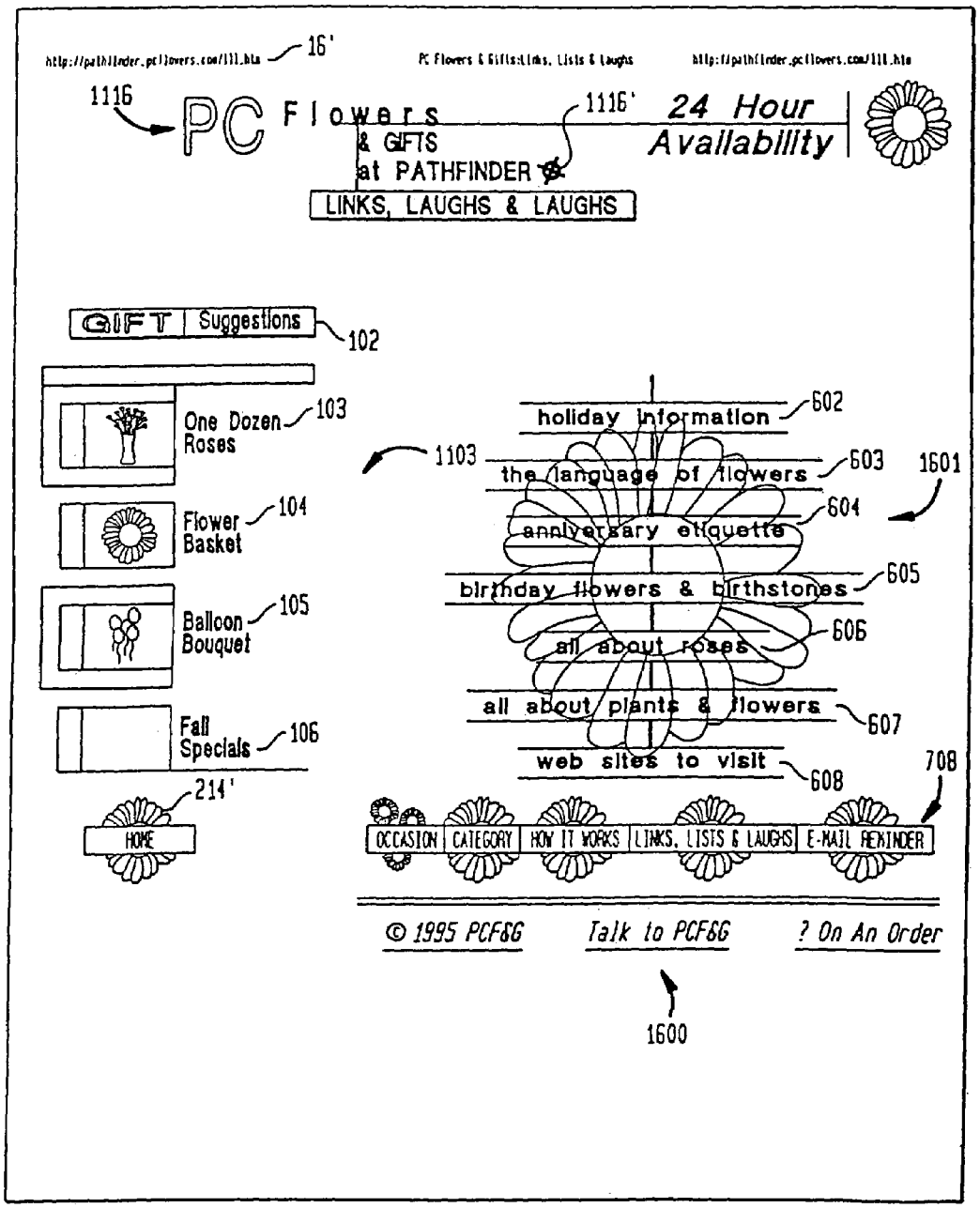
Figure 17:
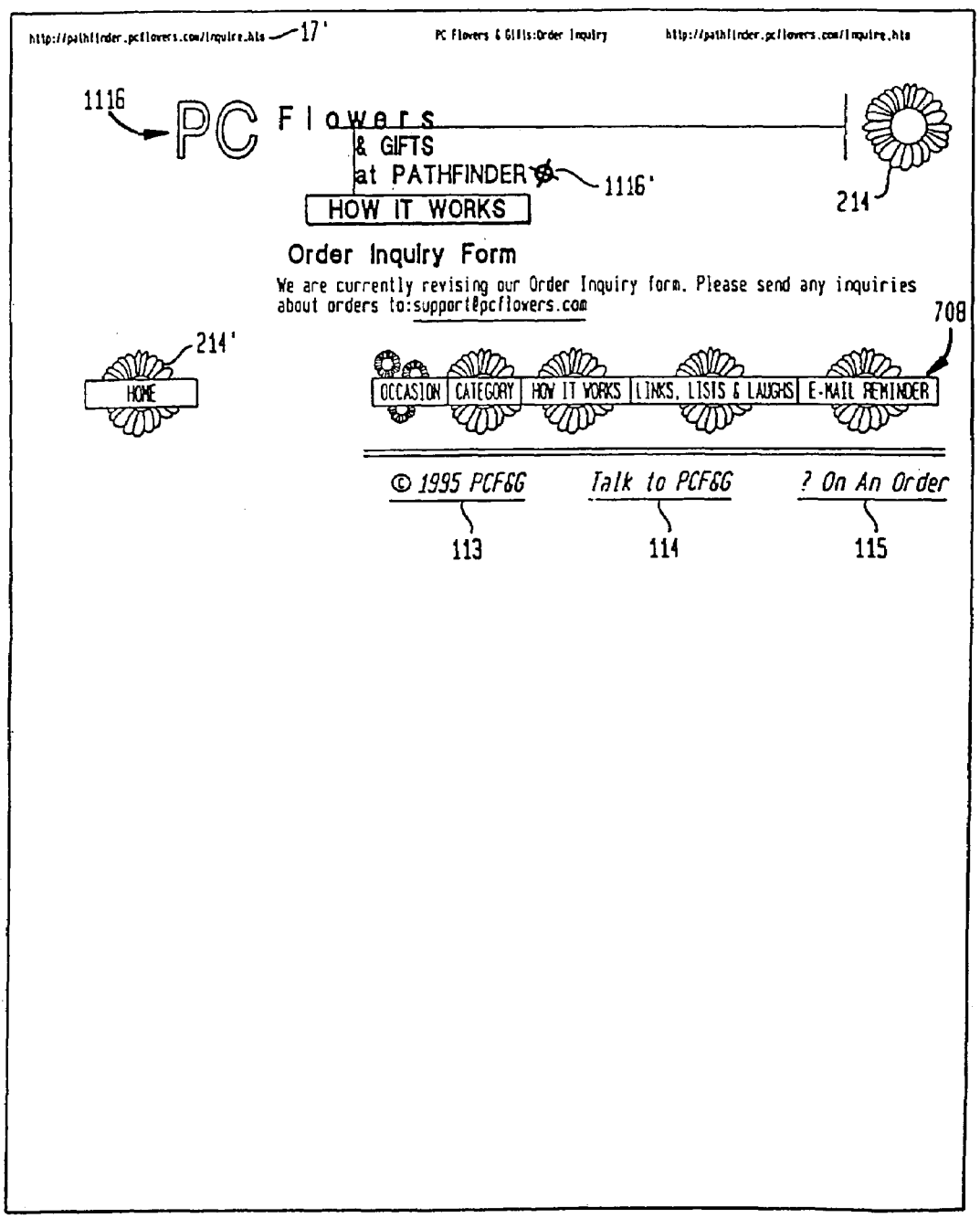
Figure 18:
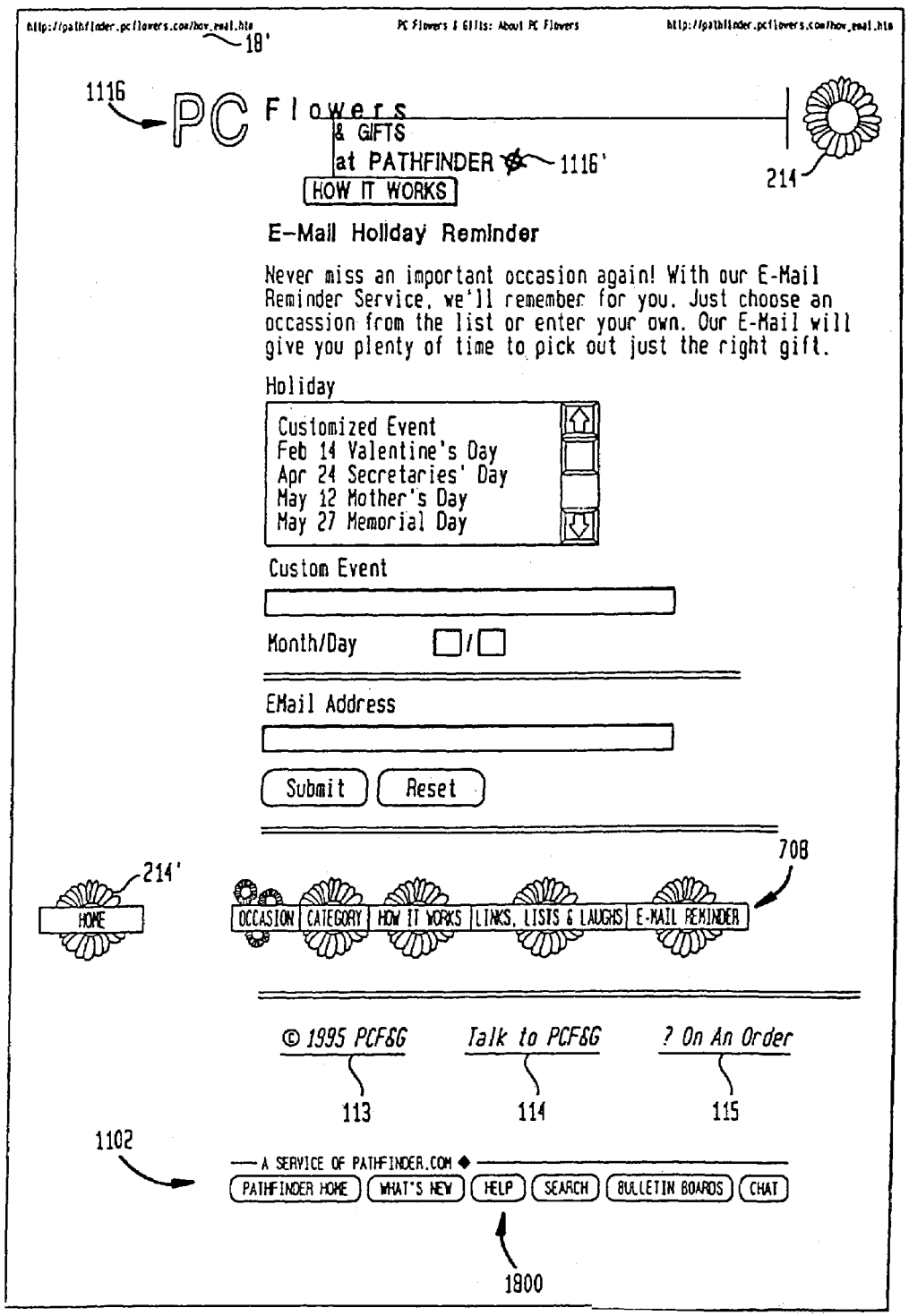
Figure 19A:
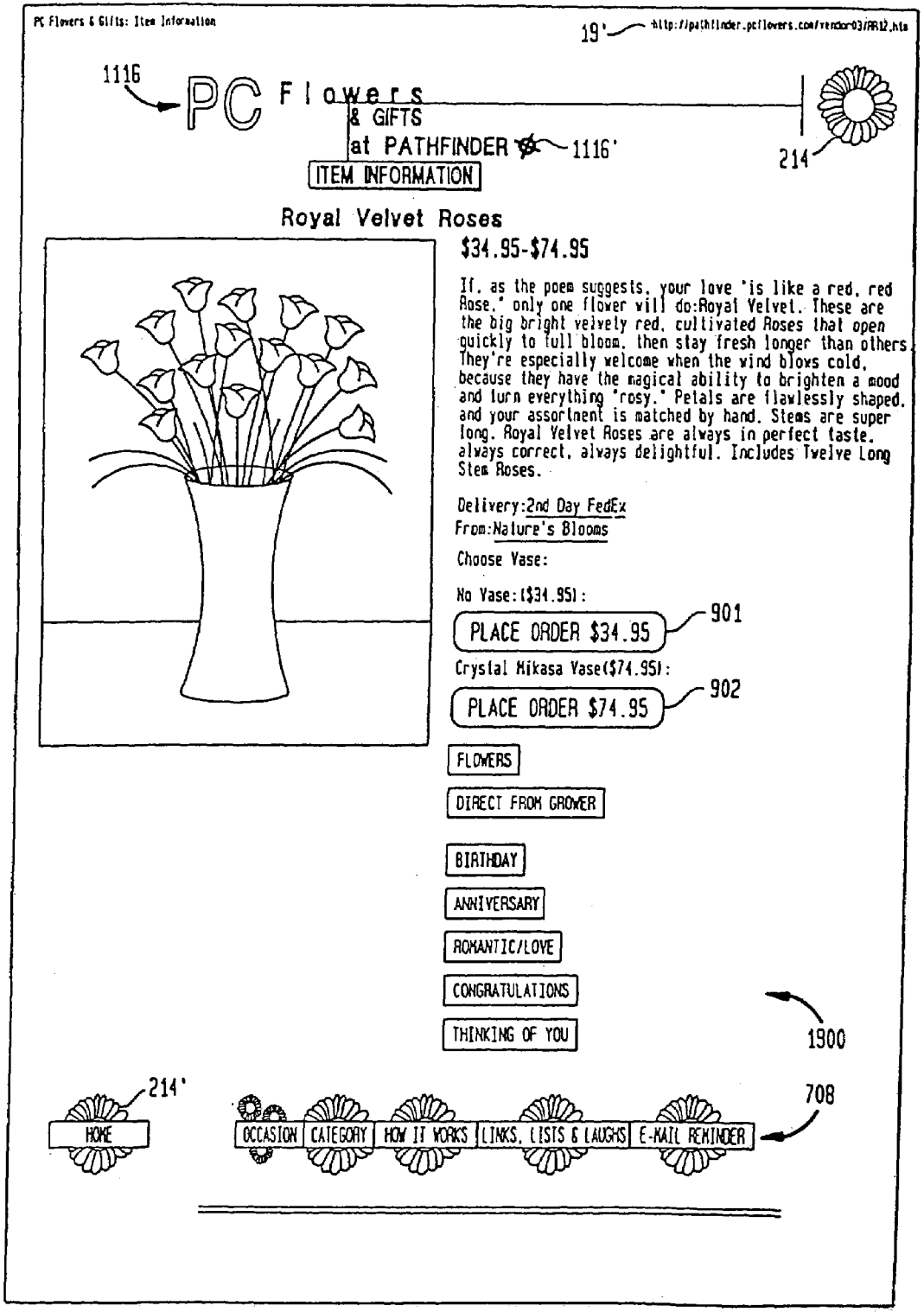
Figure 19B:
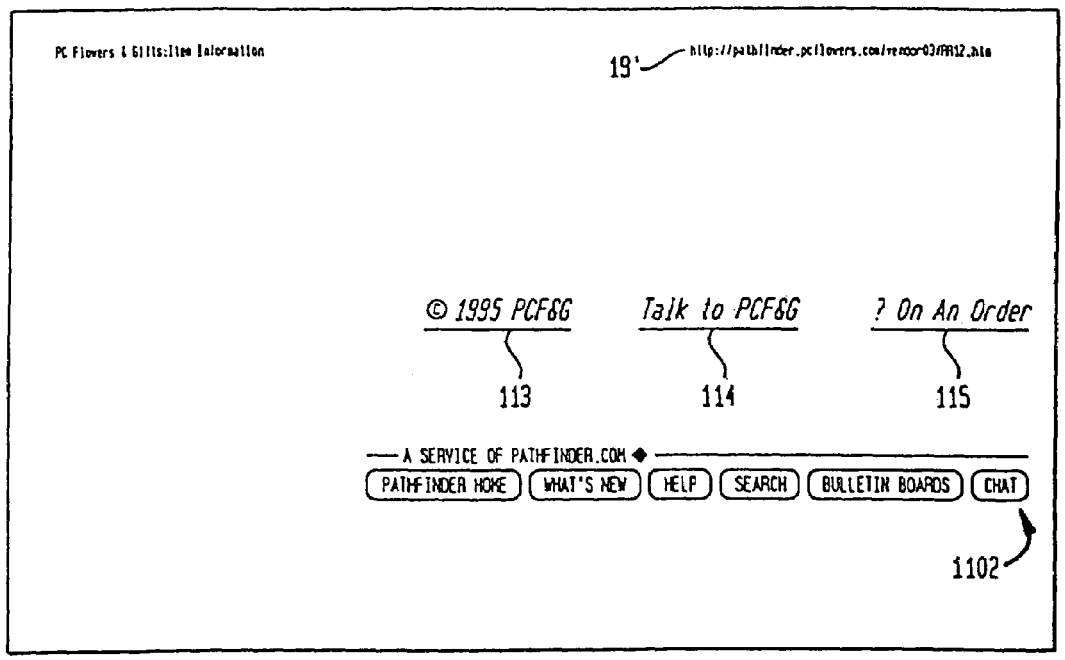
Figure 20:
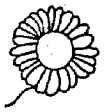

Still referring to FIG. 11C, like the home page image map 101 discussed above, the home page image map 1101 herein is a grouping of the hypertext links 108-112, which point to Web site pages that are dynamically created to reflect preferences of the marketing partner, which in this instance is Pathfinder. Accordingly, all the server Web site pages accessed through the home page image map 1101 lead to PC Flowers & Gifts Web site pages that have been customized with graphic, text, or navigational features according to Pathfinder's preferences. For example, the header 1116 is customized to include the Pathfinder brand 1116', and the navigational features 1102 of the Pathfinder Internet site are retained. Such a co-branding of Web site pages takes advantage of the client's existing relationship and familiarity with the marketing partner, Pathfinder. In addition, the hypertext link grouping 1103 retains the links 102-107 of the PC Flowers & Gifts Web site pages, however, like the home page image map 1101, the hypertext link grouping 1103 provides jumps to PC Flowers and Web site pages that are dynamically created to be co-branded with the Pathfinder name brand.

Private Label Customization

Figure 21A:
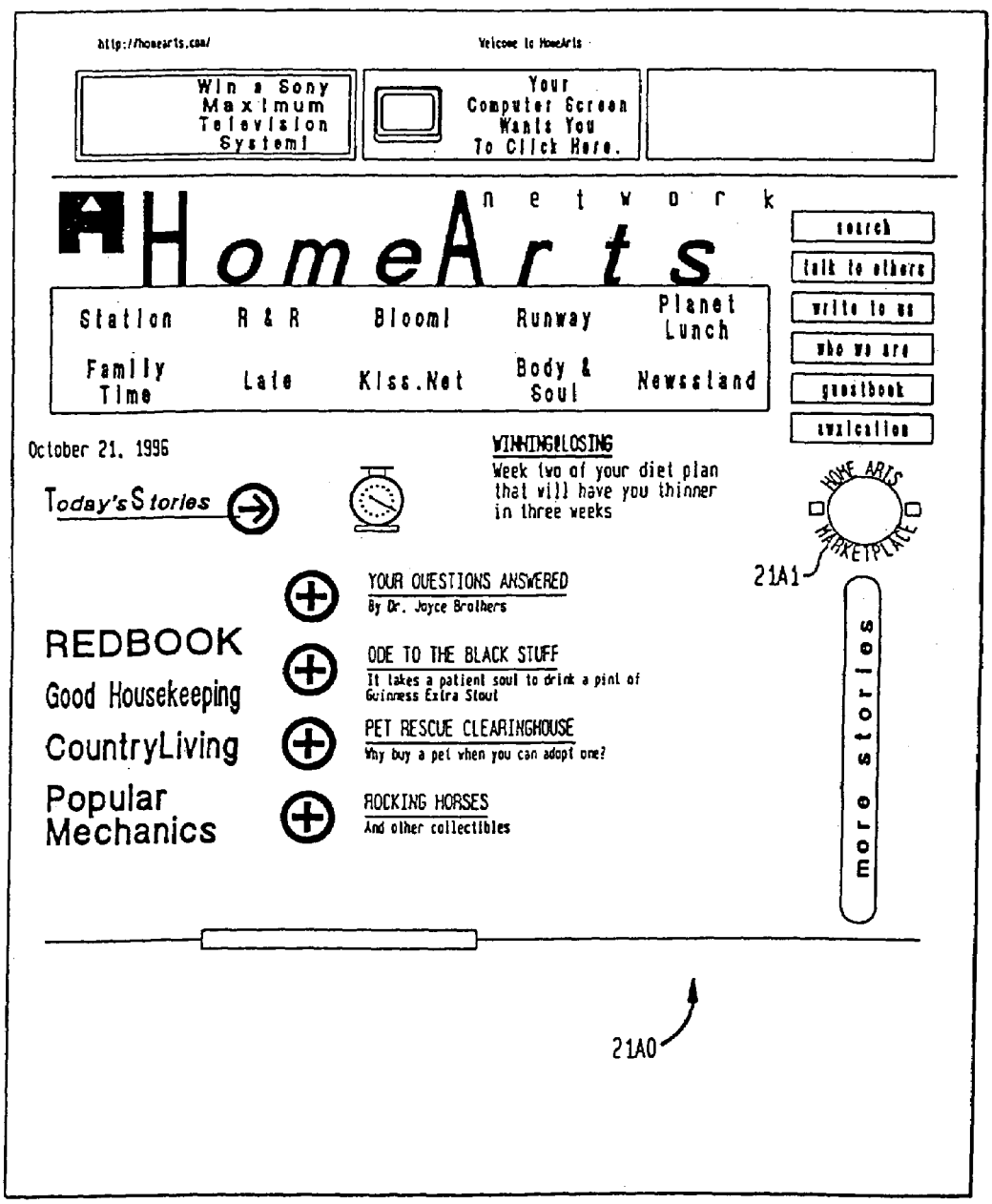
FIG. 21A is a Web site page of a marketing partner, Homearts.
Figure 21B:
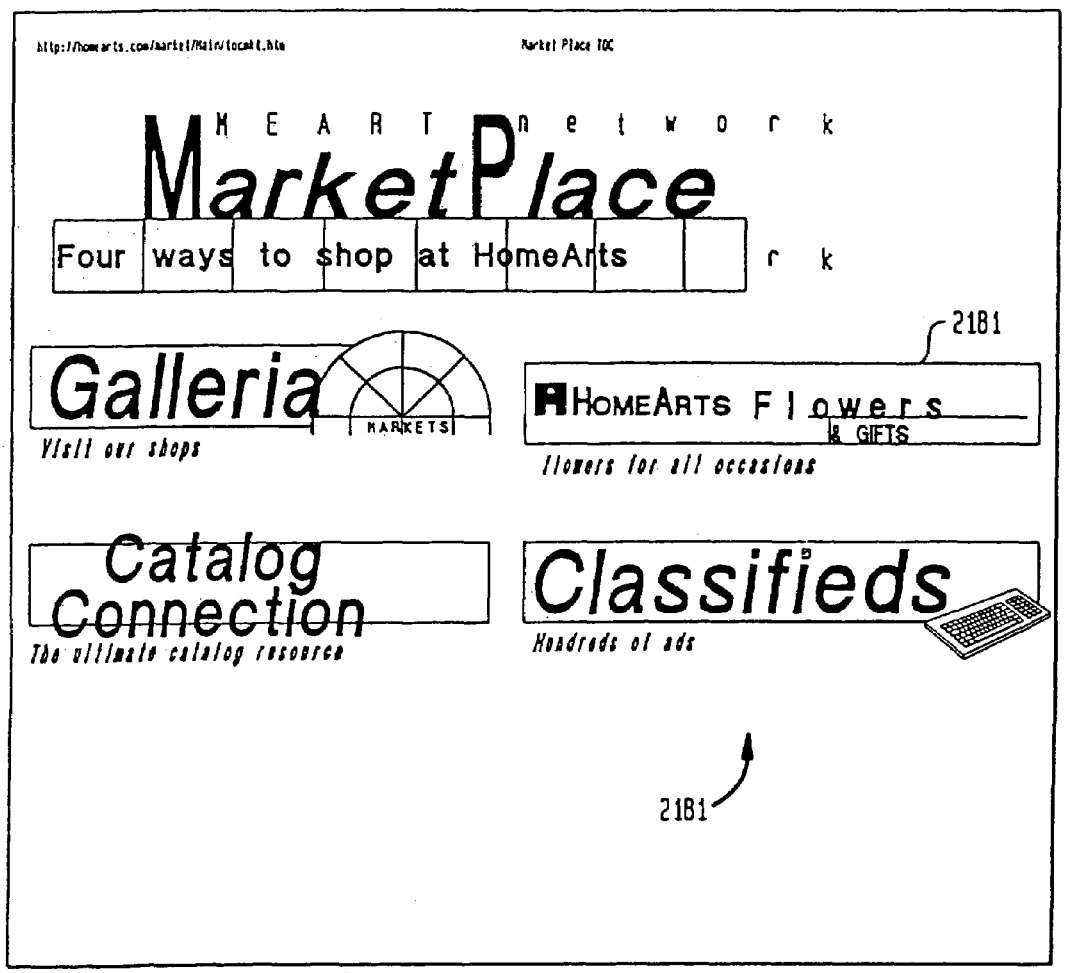
FIG. 21B is a Homearts Web site page which is accessible via a hypertext link from the Web site page depicted in FIG. 21A.

Referring to FIG. 21A there is shown a Web site page 21A0 of a marketing partner, Homearts, which prefers a "private label" customization of the PC Flowers & Gifts Web site pages depicted in FIGS. 1C-10. The Web site page 21A0 includes a hypertext link 21A1 to a Homearts' Web site page 21B1 shown in FIG. 21B, which offers marketing services to clients. The hypertext link 21B1 provides a jump to the PC Flowers & Gifts Web site pages depicted in FIGS. 1C-10, but which have been customized in accordance with the marketing partner's private label requirements.

Figure 21C:
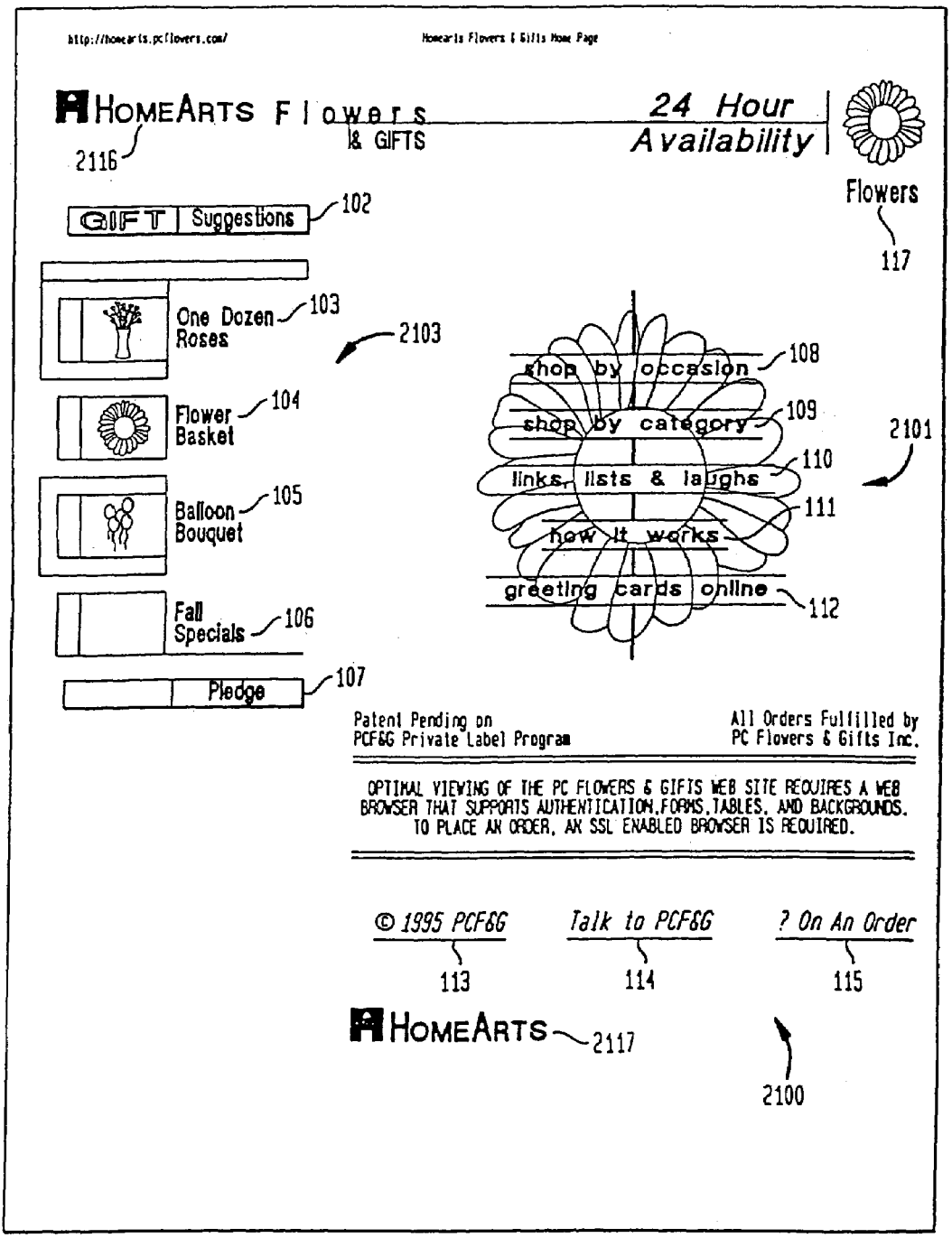
Figure 22:
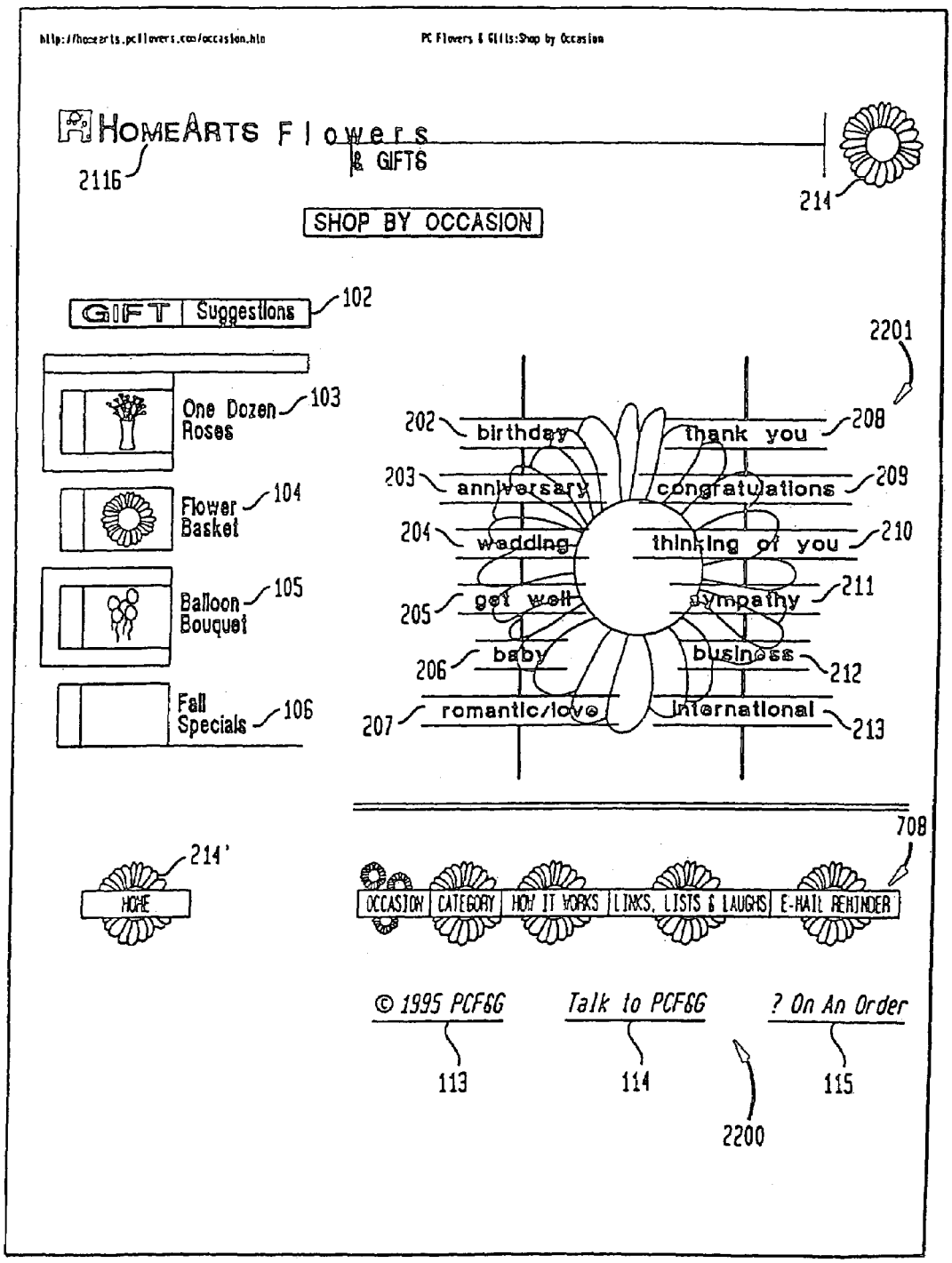
Figure 24:
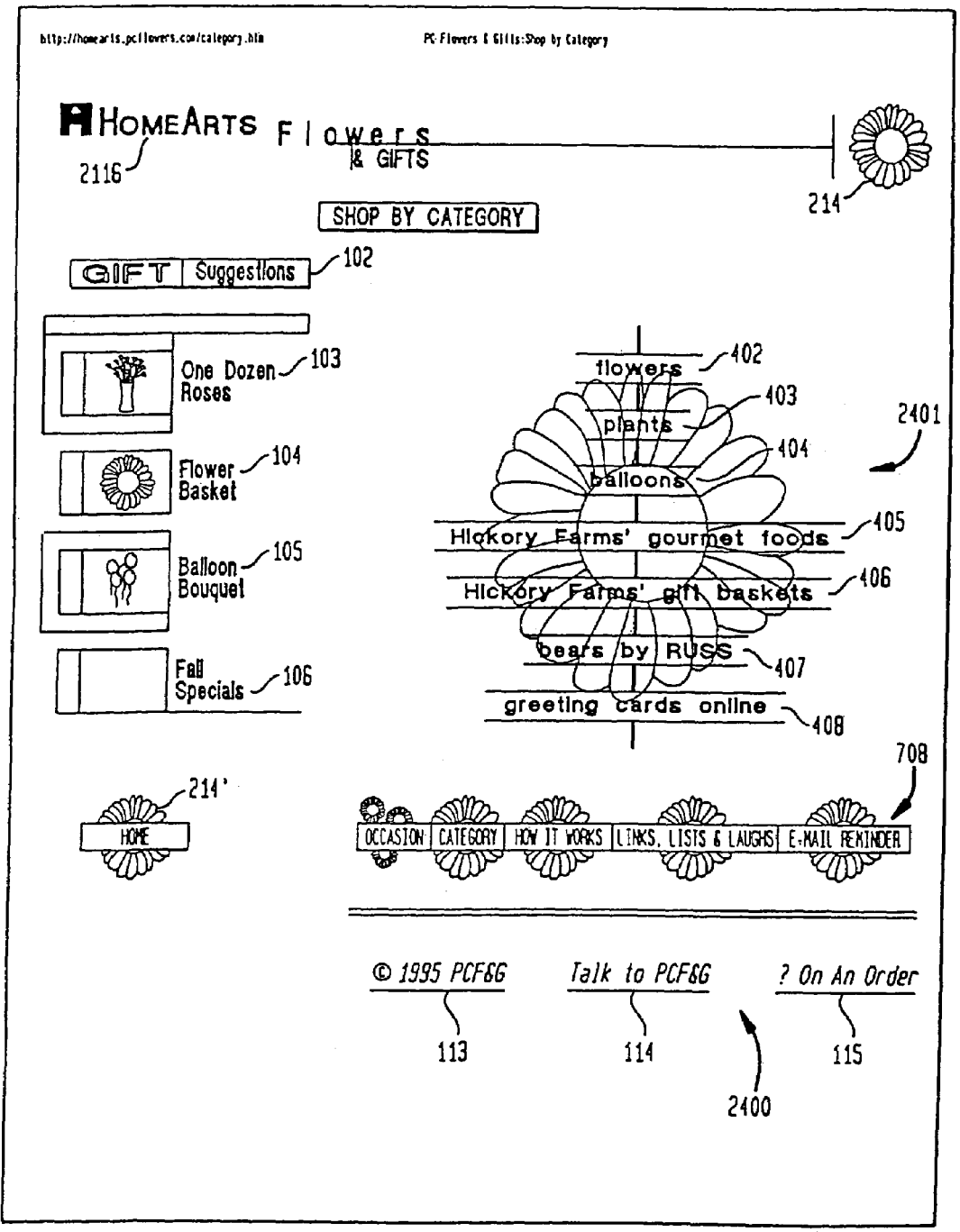
Figure 26:
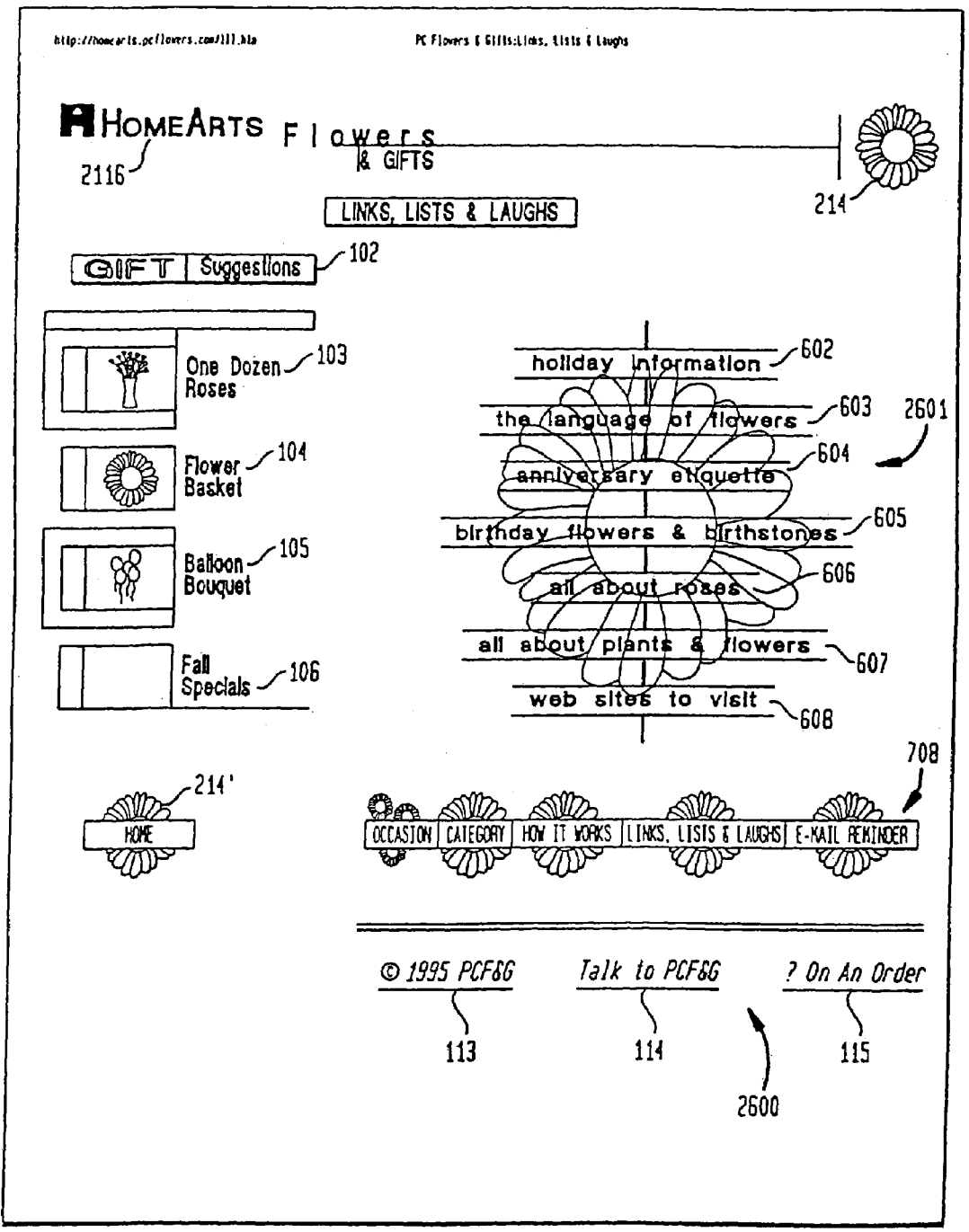
Figure 27:
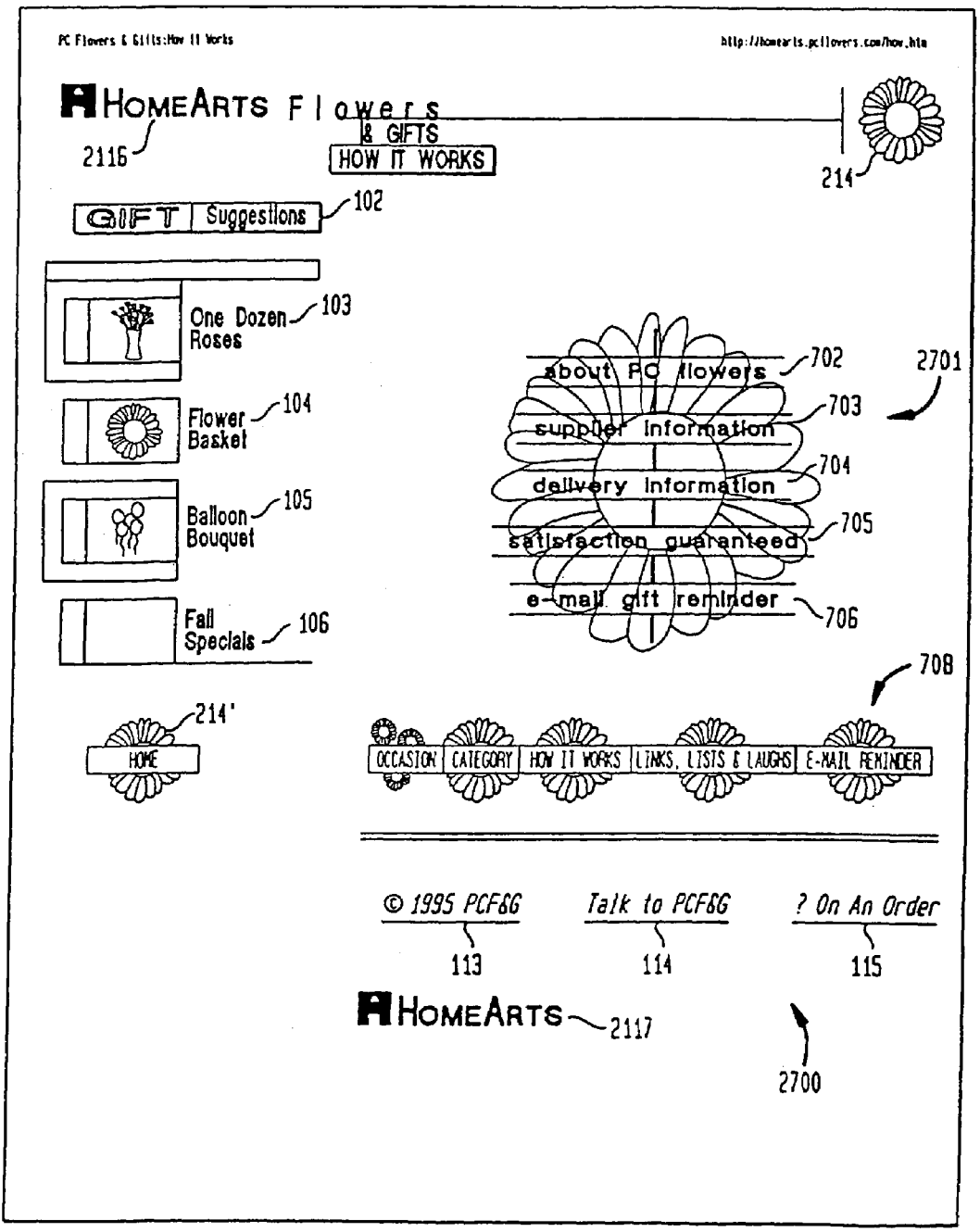
Figure 28:
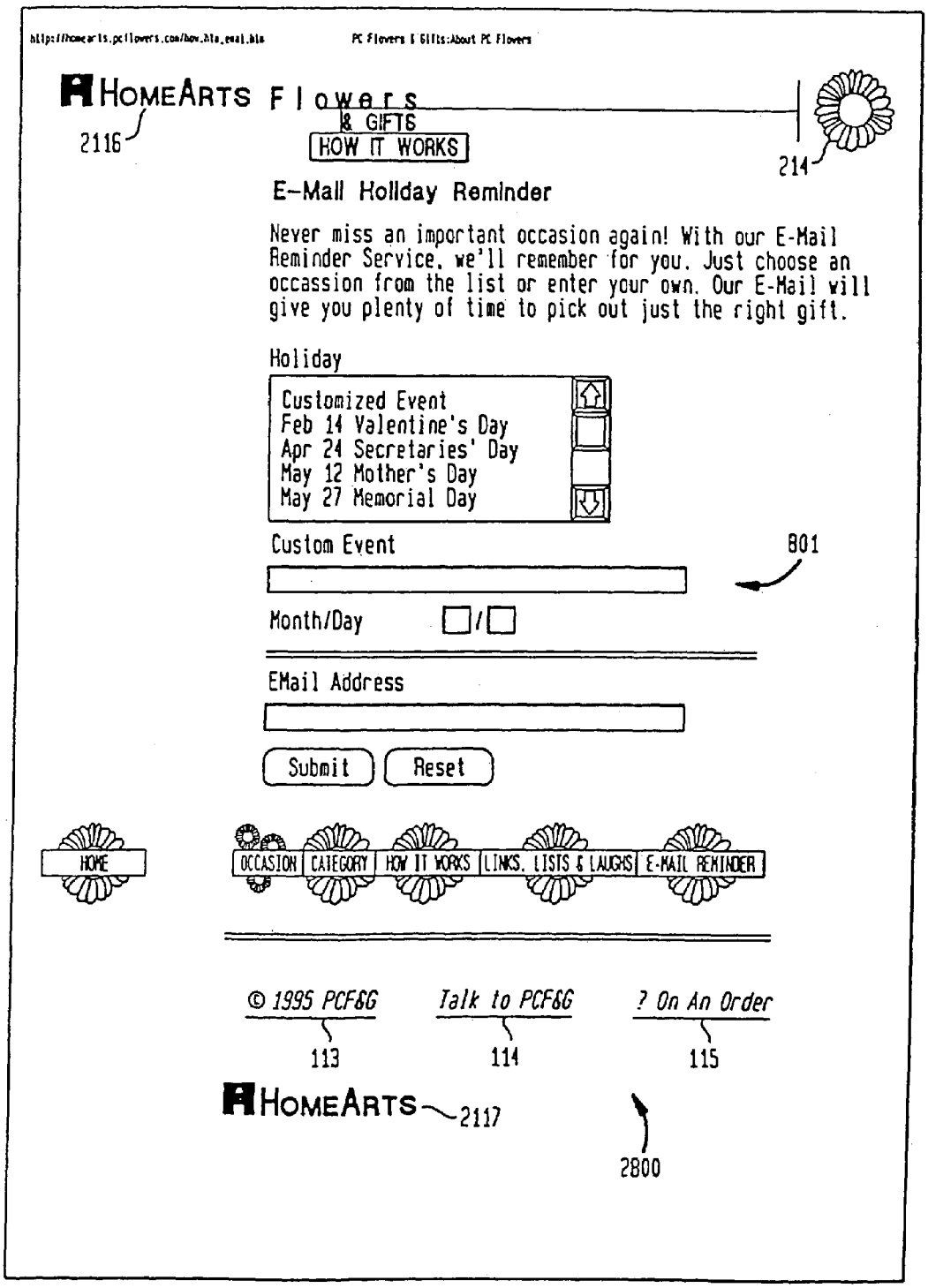
Figure 29A:
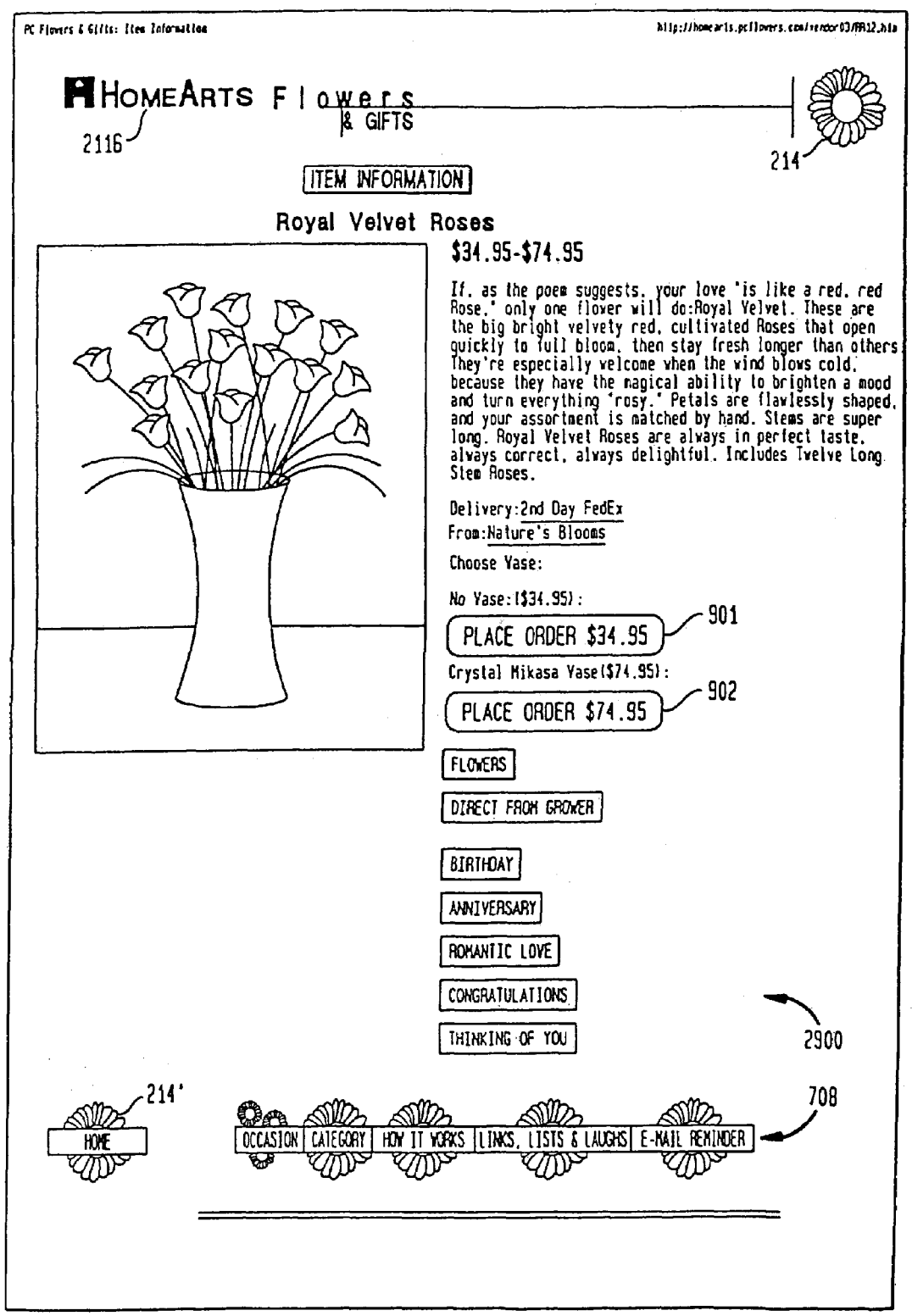
Figure 29B:
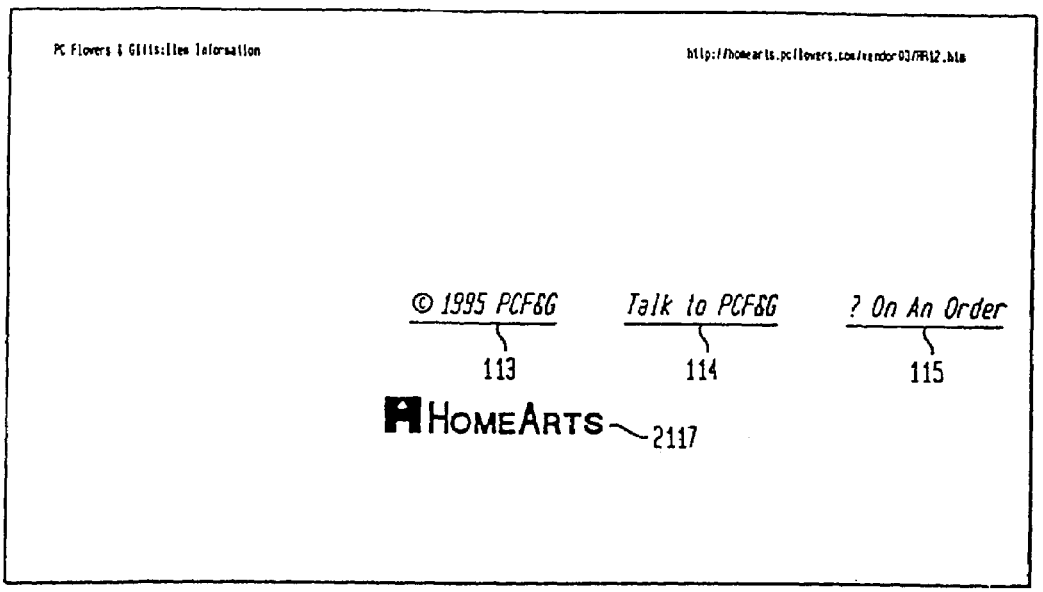

FIGS. 21-C-30 show private label Web site pages that correlate to the PC Flowers & Gifts Web site pages depicted in FIGS. 1C-10. However, the Web site pages of FIGS. 21C-30 are customized with only the marketing partner's brand, Homearts. Referring to the Web site page 2100, shown in FIG. 21C, the client's familiarity with the marketing partner's brand is reinforced through the use of a fully customized header 2116, "Homearts Flowers & Gifts", and a fully customized footer 2117, "Homearts". The fully customized header 1116 and footer 2117 are also used on Web site pages 2200, 2300, 2400, 2500, 2600, 2700, 2800, 2900 and 3000.

Still referring to FIG. 21C, like the home page image map 101 discussed above, the home page image map 2101 herein is a grouping of the hypertext links 108-112, wherein the server files for the linked Web site pages are dynamically created to reflect preferences of the marketing partner, which in this instance is a private label customizing for Homearts. Accordingly, all the server Web site pages accessed through the home page image map 2101 are anchored to PC Flowers & Gifts Web site pages that are dynamically created with fully customized graphic and text features according to Homearts' preferences. Such a private label customization of the Web site pages takes advantage of the client's existing relationship and familiarity with the marketing partner, Homearts. In addition, the hypertext link grouping 2103 retains the links 102-107 of the PC Flowers & Gifts Web site pages, however, like the home page image map 2101, the hypertext link grouping 2103 provides jumps to PC Flowers and Web site pages that are fully customized with the private label Homearts.

Dynamic Tokening

Figure 31:
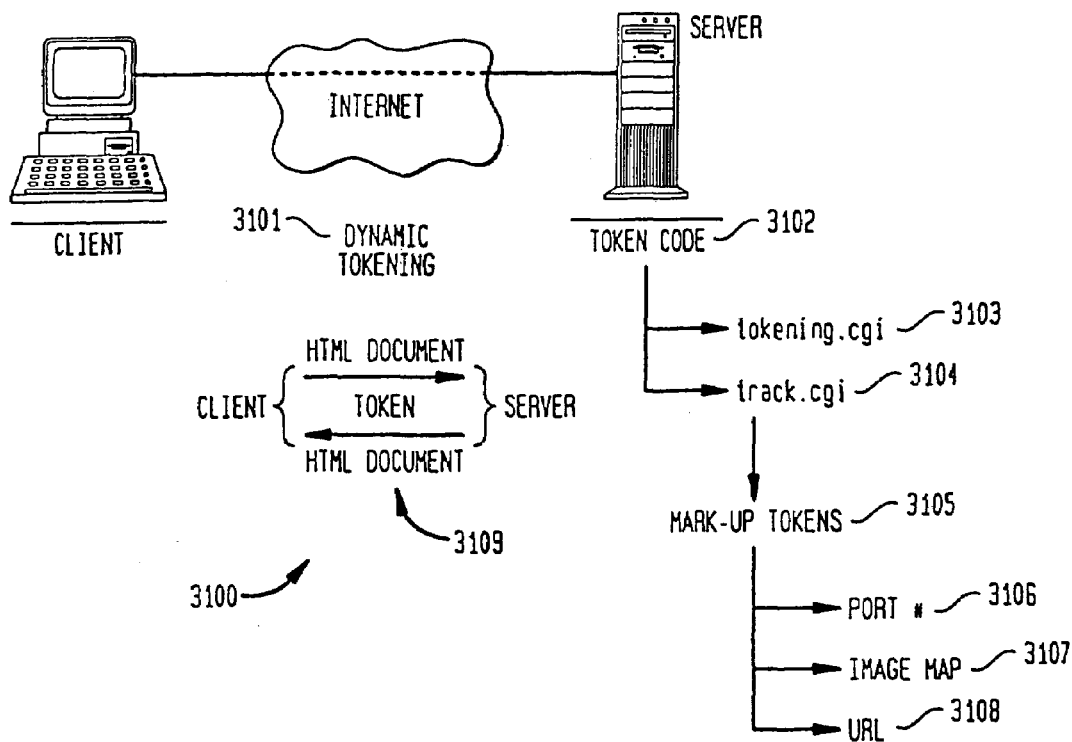
FIG. 31 is a schematic highlighting key dynamic tokening features in accordance with the present invention.

Referring now to FIG. 31, there is shown a schematic 3100 graphically illustrating a dynamic tokening structure that configures the server platform in accordance with the present invention. It is noted that the present invention technique of dynamically customizing Web site pages employs, among other techniques, dynamic tokening wherein HTML files, i.e., Web site pages, contain special markup tags or tokens. Note that the reference to HTML document is synonymous with the reference to Web site page(s) referred to elsewhere herein. An HTML document is a document which contains HTML coding that provides the hypertext jump capabilities to other HTML documents. When an HTML based document is accessed, an executable is actually called with this HTML document as a parameter. Instead of directly outputting the document, the executable instead reads in the document and scans for special mark-up tags (tokens). Non-token text is simply output to the client, i.e., user. Tokens, however, are dynamically substituted for. This allows information such as where the user's request (i.e., what WWW site) originated from to be passed along as the user navigates through the site.

The idea behind the tokening system is to track the location of the source of orders placed. For example, if Web site A, i.e., a client, agrees to link to Web site B, i.e., a server based Web site, which is selling products on the Web, then the following is possible: Web site B can track the number of orders placed by customers through this link. Web site A can then be paid on a percentage basis of sales generated by this link.

To implement dynamic tokening, every HTML page is read in by the server and output back to the user 3109. As the pages are output, the site 'token' can be appended as a parameter to all of the links. When these modified links are then selected by the user, the page being referenced is read in by the system and output back to the user. Once again, the 'token', which was passed to the original link as a parameter, is appended to all links of this newly referenced page.

Each hypertext link is a call to an executable which performs the function of reading in the page and outputting it back to the user with tokening information passed as parameters. This executable also takes the file name of the page being referenced as a parameter so the executable knows which file to read in, modify, and output. The tokening code 3102 includes the following executables or programs: tokening.cgi 3103, and track.cgi 3104, as shown in the block schematic 3100 of FIG. 31. The software token code and mark up tokens 3105 preferably reside on the server platform which the client is communicating with.

Figure 32:
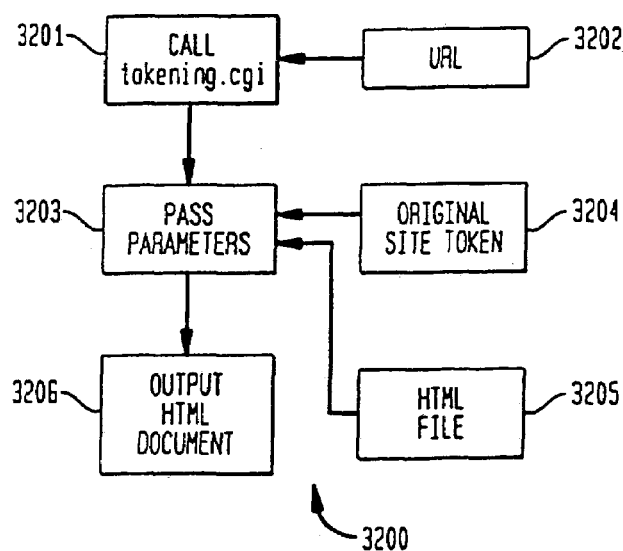
FIG. 32 is a block diagram of the principal process features of the executable tokening.cgi.

Referring now to FIG. 32 there is shown a block diagram 3200 of the key process features of the executable tokening.cgi. Upon a call via a hypertext link 3201, the executable tokening.cgi dynamically outputs an HTML page 3206, substituting in information on the original source (the site token) of the system access for special mark-up tokens in the HTML. Note that a call to the tokening.cgi appears in the browser's display of the URL. The tokening.cgi process enables the site token information to be passed from page to page 3206 and to be recorded when an order is eventually placed. Both the source of the access (the site token) 3204 and the HTML file 3205 to be output are passed to "tokening.cgi" as parameters 3203. In HTML, an action field or link calling the tokening executable would appear as: "tokening?site_token&file_name" where "site_token" is a string identifier corresponding to a Web site and "file_name" is the HTML file being accessed. For example, referring to FIG. 2, the URL 2' address contains a similar field "tokening.cgi?80&/occasion.htm.

Figure 33:
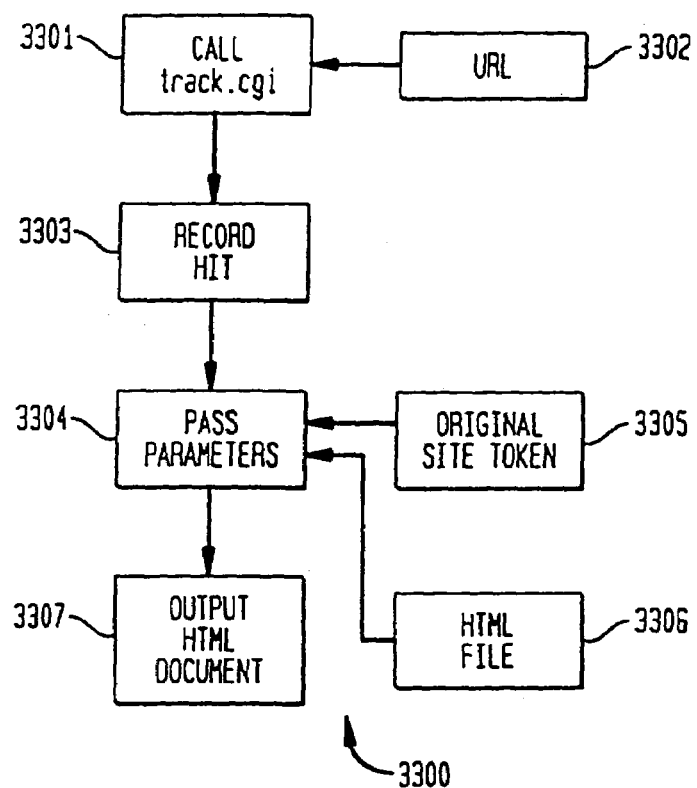
FIG. 33 is a block diagram of the principal process features of the executable track.cgi.

Referring now to FIG. 33 there is shown a block diagram 3300 of the key process features of the executable track.cgi. Under the executable track.cgi, a hit or Web site entry is recorded 3303 in the global database for the given site token, the current date, and the vendor of the home page being accessed. The code then dynamically outputs the home page, substituting in the original source (the site token) of the system access for special mark-up tokens in the HTML (as is similarly done in the tokening executable). Both the source of the access (the site token) 3305 and the HTML file 3306 to be output are passed to "track.cgi" as parameters 3304. The tracking program is preferably called 3301 as an URL 3302 to enter the PC Flowers and Gifts system from other Web sites. The program "track.cgi" records a hit and then dynamically outputs the HTML page 3307 which is referenced by the second parameter to the executable. A call 3301 to the program would appear as: "track.cgi?site_token&file_name" where "site_token" is a string identifier corresponding to a Web site and "file_name" is the HTML file being output. For example, referring to FIG. 1C, the URL 1' contains such a field "track.cgi?90&/homehtm".

Mark-Up Tokens

Rather than have the user repetitively enter in the tokening executable name and to also to keep the tokening mechanism as transparent as possible, a special "HTML extension" mark-up tag is defined. This mark-up token 3105 appears in links of the static HTML files. This tag is searched for by the tokening executable and, when found, is substituted in with a call to itself (the tokening executable) with the same site token passed along as a parameter. To accommodate the functionality of the above dynamic tokening, the present invention utilizes, among others, mark-up tokens 3105: Port# 3106 and, IMAGEMAP 3107 and URL 3108.

The PORT# 3106 mark-up tag or token is defined as an HTML extension and is embedded within the HTML pages that the server accesses. The PORT# token 3106 is the original token defined to perform the task of dynamically passing site information from HTML page to page., i.e., Web site page to Web site page such as from FIG. 1C to FIG. 2. This token 3106 will therefore appear most often in the site's HTML pages. This token should appear as follows in all links to the site's HTML pages, other than order forms, image maps, and form action fields. Order forms, image maps, and form action fields are handled separately with other tokens. Also note that references to graphics should *not* contain this token since graphics do not directly contain links and graphic files are in binary and not text. Regular links (see above) will appear as:

<a href="~PORT#~html_page_path_name"> </a, where the "html_page_path_name" is specified from the document root. The system will dynamically append the document root's path name if needed. It is noted that the token PORT# 3106 appears immediately before the path name with no white space or other characters in between the two, and that quotation marks surround the token/path name. For example, the PORT# 80 is carried through in URLs 1'-10' of FIGS. 1C through 10, respectively.

As one can ascertain an implementation of the system is divided into two main portions, designated as the product selection area and the check-out area.

Product Selection Area

The product selection area must support several design goals:

It must easily reflect changes in product descriptions;

It must accommodate changes to prices and shipping methods.

There are principally two approaches to creating such a web site. The first method involves creating individual web pages with hypertext pointers to the Check-Out area with product selection encoded. The second method involves the use of a database and a program to create the individual web pages dynamically. This method is currently substantially slower, and in a highly successful web site would cause unacceptable performance. In practice, the product descriptions, prices, images, and shipping information change infrequently and can be scheduled to occur at off-peak hours. The PCFlowers site takes an innovative approach to the problem.

In addition, each Product Selection area has 4 key components:

Private label home page;
Private label collection selector page;
Private label collection page;
Private label product detail page.

Private Label Home Page

Each private label web site has on each page a custom icon that hyperlinks back to the private label partner's web site, a navigation bar that hyperlinks to areas within the private label partner's web site and maintains the look and feel of the partner's web site.

Private Label Collection Selector Page

The private label collection selector page is an aggregation of hyperlinks to the private label collection pages. The hyperlinks are accessed through a graphical client-side image map. In order to support the preferences of the vendors and private label partners, the graphic and map coordinates are automatically generated. In this manner, if a partner does not wish to offer products from a particular vendor, the appropriate values are set in the partner database.

Private Label Collection Page

By designing a web site generator based on an Abstract Syntax Notation (ASN) that mimics an object-oriented database, the sites' Product Selection Areas can be generated as web pages, while retaining the individual character of each site. The ASN analyzes the creation date of each constituent element of the web page, analyzes the dependencies that exist in creating the resulting web page, and determine if the page needs to be updated. If so, the ASN parser applies the object-oriented method appropriate to that object, and creates the resulting web page element. The elements are assembled into a final web page.

Private Label Product Detail Page

The design of the product detail page employs an object-oriented method related to the private label collection page.

Check Out

The check-out area of the site has the following components:
 Order page;
 Order error page;
 Order confirmation page.

Order Page

The order is arrived at from any one of the product detail pages. The site ID, product ID, and any product options are encoded in the hypertext access. The order page prompts the user for sender, recipient, personalization, and payment information. In addition, if any custom offerings are currently in place for this partner site, they are presented at this time. Customizations occur in two ways. First, the user interface may be modified to capture additional customer information such as a coupon number. Each partner can have a separate mechanism for validating coupon numbers, that is invoked at the time the order page is generated. The second customization area is not seen directly by the user, but manifests in pricing incentives, discounts by percentage or fixed dollar amount. When the order page is filled, the custom discount pricing is transmitted to the order confirmation page. The page maintains the look and feel conventions of the partner site by accessing the site ID information encoded in the access. Upon completing the form, the user submits the information, and is transported to either the order confirmation page or the order error page, in the event of missing or improperly formatted data.

Order Error Page

The order error page is generated in the event of missing or malformatted data. In this event, the user is offered input areas to correct the missing elements, along with a textual description and explanation of the missing information. The look and feel of the private label partner is maintained on the order error page.

Order Confirmation Page

The order confirmation page is generated upon successful completion of the Order Page or Order Error Page. The user has displayed a summary of the transaction. At this time, the system also generates an e-mail version of the confirmation information.

Image Map Dynamics

Referring back to FIG. 1C, it is noted that the image map 101 is a grouping of hypertext links 108-112, that provide jumps to Web site pages indicated, respectively, as "shop by occasion", "shop by category", "links, lists and laughs", "how it works", and "greeting cards". This grouping of hypertext links 108-112 is an image mapping of server files which are created dynamically at the time the client or user jumps onto the home page 100. Configuration of the image map 101 entails two components, the client's xy coordinate pointer position and the matching of server database files. The server calls out database map files based on variables such as a particular vendor, date, particular occasion, etc.

Respecting the IMAGEMAP 3107 and URL 3108 mark up tokens, the dynamic tokening scheme necessitates special handling of image maps, such as 101, 1101, etc., since image maps contain anchors to other pages. The implementation of image maps makes use of the PORT# 3106 token as well as the tokens: URL 3108 and IMAGEMAP 3107. The URL token 3108 appears in a map template file while the IMAGEMAP token 3107 appears in the anchor for the image map. The assumption is that image maps are handled in a manner similar to the Netscape Commerce Server's handling. Specifically, Netscape servers reference image maps with the following line: a href="image map path name"> <img src="graphic path name" ISMAP></a>. This differs from NCSA base servers where an actual entry in the image map configuration file must exist for each image map.

Dynamic image maps, such as 101 or 1101, work in a similar manner to the other tokening mechanisms except for the handling of the map files themselves. The reference (i.e. the anchor) to the image map should appear as: <a href="IMAGEMAP"> <img src="graphic path name" ISMAP></a>. This line is essentially the same as an image map reference without the dynamic tokening system. The only difference is that instead of a path name of the image map file, the token IMAGEMAP appears (inside of quotation marks).

In the same directory as the file with the above image map file reference, there must be a file name of the same name but with the file extension ".map". For instance, if there is an image map reference in the file "XXX.htm", then in the same directory there must be a file "XXX.map". This file is a generalized version of a standard image map file. In each line of this image map file, the URL should be replaced with the URL token 3108 immediately followed by the HTML file that should be displayed. The HTML file should be specified from the document root, i.e., do not include the "/document_root" portion of the full path name. Static image map files are created from this template file for each token as they are encountered. For example, the following lines illustrate a ".map" file.

default ~URL~/error.htm
poly ~URL~/vendor03/index01.htm 127,3 193,3 217,51 193, 101 127,101 102,51
poly ~URL~/vendor05/index03.htm 223,54 208,54 313,103 288,151 223,151
poly ~URL~/vendor03/index02.htm 31,56 96,56 120,104 95,151 31,151 6,104
poly ~URL~/vendor04/index04.htm 31,158 96,158 119,206 95,255 31,255 6,206
poly ~URL~/vendor04/giftbskt.htm 225,156 293,156 319, 207 293,259 225,259
poly ~URL~/vendor02/home.htm 127,208 192,208 217,258 192,306 127,306
poly ~URL~/vendor03/special.htm 125,106 194,104 221,154 193,204 124,204

When a file "XXX.htm" with an image map link is reference from "port"YYY and the IMAGEMAP token is encountered, then the following occurs: The system looks in the same directory as the file "XXX.htm" and searches for a file named "YYYXXX.map". If the file already exists, then it is used as the image map file. If the file does not exist, then the system searches the same directory that the file "XXX.htm" appears in for a file named "XXX.map". If this file is not present, the system returns an error. Otherwise, the system generates a file named "YYYXXX.map" from the template file and this file is then used as the map file for the access (and all subsequent accesses from port YYY). The reason that the image map files are created dynamically is that the number and names of ports (i.e. site tokens) are not known ahead of time. With this scheme, hard-coded additions do not need to be made every time a port token is added.

Since an image map must have a corresponding ".map" file with the same name and in the same directory as the file the image map reference appears in, this scheme allows only one image map per file. In addition. a Netscape server (or a server which handles image maps in a similar manner to a Netscape server) must be used. For the NCSA server for example, each image map must have an entry in an image map configuration file as well as an image map file. These entries can not be created dynamically easily since the file can only be edited as 'root' and since the daemon would have to be stopped and restarted (as 'root').

Vendor Participation

Regarding vendor related functions, the overall server set-up is configured in such a manner that the individual vendors have near complete control over their HTML pages and the pulling of their orders (as long as system conventions are adhered to). Despite this control, the system also has standardized, centralized order processing, gift reminders, and system HTML pages. The vendor control, as well as system protection from inadvertent or malicious vendor actions, is provided by individual databases for each vendor as well as restricted accounts and access to directories for each vendor.

A vendor is given a number between 02and 99. This number identifies the vendor throughout the system and is included in the naming of the vendor database, the vendor FTP and Netscape id's, and the location of vendor files off of the document root to name a few things. For instance, vendor 02has a database named "vdb02", login id's "guest02", and HTML files located at "/document_root/vendor02". See FIG. 5 where the URL 5' string displays " . . . /vendor03/ . . . ", which indicates that the vendor's number is 03.

In addition, order numbers are pre-pended with the vendor number. So, order number '12' for vendor 02is referred to as order number '0212' outside of the system. Note that internally though, the order number is stored only as order number '12'. This is due to the fact that the vendor number is implicit in the vendor database in which the order resides. For this example, order number '12' would be stored in database "vdb02". The vendor number'00' is sometimes used as a default for the global database 'globaldb'. (e.g. hits and gift reminders) and therefore can not be used for a vendor. The vendor number '01' is reserved for the plants and roses FAQ section. These vendor database files are automatically generated and uploaded to the server via the 'guest01' account.

Figure 34:
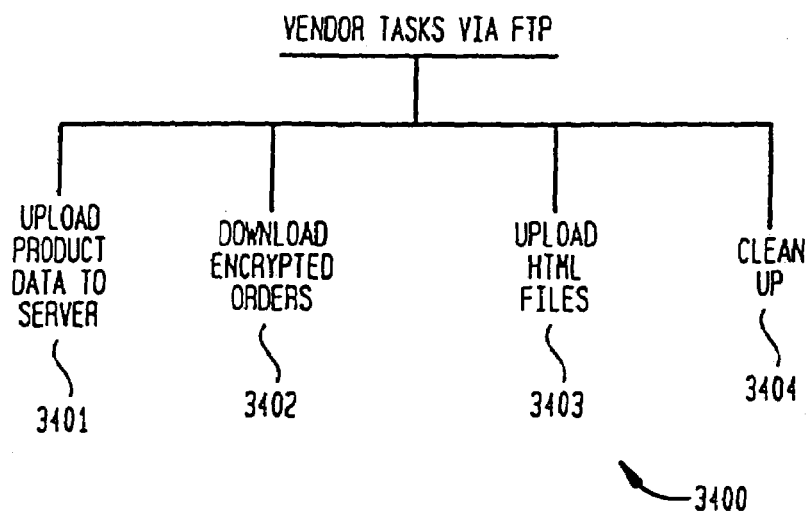
FIG. 34 is a schematic of vendor tasks.

Vendor's can access the server via FTP and a browser interface. Each vendor has an FTP only account with the id: "guestXX" where XX is the vendor number. The home directory is: /document_root/vendorXX/vendorXX. As shown by the schematic 3400 of FIG. 34, vendors FTP to the server to perform the following tasks: 1) Upload "prod.dat" file 3401. The "prod.dat" needs to be the vendor's home directory so that the preprocessor code can locate it. The preprocessor will also place the corresponding "prod.imp" and "prod.log" files which it generates in the vendor's home directory; 2) Download encrypted files containing orders 3402. When a vendor pulls orders from his database, the orders are placed in an encrypted file in the vendor's home directory; 3) Upload HTML files 3403. The vendor's HTML files should reside in the directory "/document_root/vendorXX" (one directory up from the vendor's home directory). Sub-directories from this directory may exist but they obviously must be specified in all of the paths found in the actual HTML; and 4) Clean-up 3404 (removing old order files or old HTML files).

When orders are pulled from a database by a vendor, they are placed in a file and the file is encrypted. This encryption of order files is mainly intended to protect credit card numbers from being obtained as the order batch files are transferred across the Internet. Credit card numbers do sit unencrypted in the database. Protection of these numbers is achieved through the use of db2 access permissions as well as restricted FTP and telnet access to the server itself.

Encryption

A commercially available encryption software, ViaCrypt's PGP software, is used to do this public encryption in the following manner: (1) Vendor's typically create their own public/private key pair and to send the public key to ISSC via means they see appropriate. (2) A military grade key pair is preferred (1024 bit key); ISSC creates its own public/private key pair be used as the "system administrator's" key, preferably a military grade key pair is selected (1024 bit key). It is noted that for vendors, only the public key resides on the server, whereas for ISSC the private key sits on the server but the pass phrase does not. ISSC also stores its private key on a local development server and the vendors store their keys locally on their PC's. (3) ISSC signs the vendor keys when they are received, in this way the id cannot be changed maliciously in the future by someone who shouldn't be editing the key. (4) When orders are pulled from the database by the cgi programs run by the vendors, the orders are placed in a file and encrypted with both the vendor's public key and the system administrator's key. The latter key is used so that the encrypted data can be recovered by ISSC if a vendor does something fatal (like forgetting his pass phrase!). (5) Orders are encrypted with the wipe option (-w) so that the data file is written over with random data and then deleted. (6) Digital signatures are not used.

ALTERNATIVE EMBODIMENTS

It should be noted that application of the key features of the present invention disclosed herein may be practiced with client/server based communications across "Intranets". In simple terms, Intranet is a descriptive term being used for the implementation of Internet technologies within a locally defined group of clients or users, rather than for the external connection to the global Internet. The main technology components of the Internet are:—communications protocol, i.e., TCP/IP, providing the ability to connect and communicate between networks and individual desktop devices; the ability to transfer files between point-to-point locations; the ability to provide direct point-to-point communication between individuals or groups; the ability to provide access to information on a one to many basis, on demand; the ability to access existing infrastructure applications; and the ability to deliver the increasing technical complexity to the desktop in a transparent, seamless and intuitive manner.

During the evolution of the Internet, a series of applications have been created to meet the specific needs of each component area. Within each of these areas the survival of the fittest has brought several specific best-of-breed applications and standards. For example, the FTP protocol standard for file transfer, the Mosaic technology for Web browsing, the MIME standard for transparent distribution of all file formats, the HTML syntax as the language of the Web, etc.

The present invention features of marketing through dynamic customization of Web site based HTML tagged documents, as described herein, are readily applicable to Intranets defined by geographic regions such as cities or states. Alternatively, the Intranet can be defined by a particular class of online customers such as "Digital City" customers which are a part of America Online's service. Moreover, several distinct Intranets can be defined by grouping Digital City customers according to geographic areas such as cities. In accordance with the present invention features disclosed herein, the content on the PC Flowers & Gifts Web pages can be customized for each distinct Intranet.

It should be understood that the embodiment described herein is merely exemplary and that a person skilled in the art may make many variations and modifications to these embodiment(s) utilizing functionally equivalent elements to those described herein. Any and all such variations or modifications as well as others which may become apparent to those skilled in the art, are intended to be included within the scope of the invention as defined by the appended claims.

What is claimed is:

1. A method of paying a commission comprising:
receiving a request for information to be displayed to a user, wherein the request includes a token associated with a graphic identifying a Web page of a destination Web site, wherein the token corresponds to a source Web site that referred the user to the destination Web site;
transmitting the Web page of the destination Web site in response to the request;
determining the identity of the source Web site or source entity from the token; and
paying determining a commission to a source entity associated with the source Web site for a purchase if the user purchases a product or service after accessing the identified Web page of the destination Web site.

2. A method of paying a commission comprising:
assigning a unique token to each of a plurality of source Web sites;
receiving requests for information from a plurality of users, wherein the requests include a token associated with a graphic identifying a Web page of a destination Web site, wherein the token corresponds to one of the plurality of the source Web sites;
transmitting a Web page of the destination Web site in response to the requests;
when a user purchases a product or service after accessing the Web page of the destination Web site, using the token provided in the request received from the user to determine the identity of the source Web site; and
determining and paying a commission for the purchase to a source entity associated with the source Web site.

3. A method of receiving a commission comprising:
a source Web site transmitting a Web page to a user over the Internet, the Web page including a hyperlink visually represented by a graphic and pointing to a destination Web site, the hyperlink including a token identifying the source Web site such that the token is provided to the destination Web site when the user selects the hyperlink; and
receiving a commission based on products or services sold to the user who was referred to the destination Web site via the hyperlink.

4. A method of purchasing products or services comprising:
receiving a Web page from a source Web site, wherein the Web page includes a hyperlink visually represented by a graphic and the hyperlink includes information corresponding to the identity of the source Web site;
transmitting a request for a destination Web page via the hyperlink visually represented by a graphic such that information corresponding to the identity of the source Web site is provided to the Web site corresponding to the destination Web page;
navigating from the destination Web page to a purchasing page associated with the destination Web page for purchasing a product or service via the use of hyperlinks; and
purchasing a product or service via the purchasing page, wherein a token is used to identify the source entity associated with the source Web site and paying a commission based on the products or services purchased by a user to the source entity associated with the source Web site.

5. A method of paying a commission comprising:
sending a source Web page of a source Web site operated by a source entity to a user, wherein the source Web page includes a hyperlink visually represented by a graphic, wherein the hyperlink includes a pointer to a destination Web page of a destination Web site and an identifier of the source Web page;
requesting the destination Web page by the user's use of the hyperlink;
navigating from the destination Web page to a purchasing Web page for the purchase of products or services, wherein the identifier of the source entity is maintained as the user navigates from the destination Web page to the purchasing Web page; and
calculating and paying a commission based on the price of products or services purchased by the user, the commission to be paid to the source entity associated with the source Web site based on the identifier.

6. A method of paying a commission comprising:
receiving a request for a first Web page from a user, the user being provided with the address of the first Web page by a source Web site;
transmitting the first Web page to the user;
receiving a request for a second Web page from the user, the user being provided with the address of the second Web page via a hyperlink visually represented by a graphic from the first Web page;
tracking the identity of the source Web site such that the identity is retained during or after the transmission of the second Web page;
transmitting the second Web page to the user;
receiving a request from the user for the purchase of products or services;
using the identity of the source Web site to pay a commission to a source entity associated with the source Web page based on the purchase of the products or services by the user; and
paying the commission.

7. A method of purchasing products or services comprising:
receiving a Web page from a source Web site, the Web page including a hyperlink visually represented by a graphic to a destination Web page at a destination Web site;
activating the hyperlink so as to request the destination Web page;
receiving the destination Web page wherein the destination Web page includes a hyperlink to another Web page of the destination Web site; and
receiving a purchasing Web page, wherein the purchasing Web page was received by navigating through one or more Web pages starting with the hyperlink included on the destination Web page, wherein the identity of the source Web sire remains available to the destination Web site during the navigation; and
purchasing a product or service via the purchasing Web page, wherein a payment is made to an entity associated with the source Web site based upon such purchase.

8. A method paying a commission comprising:
- transmitting a destination Web page to a user, wherein the user navigated to the destination Web page from a source Web site by a hyperlink visually represented by a graphic;
- providing the user with an identification of the source Web site along with the destination Web page so that the identification of the source Web site may be saved on the user's computer;
- receiving a request from the user for a Web page of the destination Web site;
- receiving the identification of the source Web site from the user's computer;
- transmitting the requested Web page of the destination Web site; and
- paying a commission to be paid if the user purchases a product or service from the destination Web site or a Web page directly or indirectly associated with the destination Web site based on the identification of the source Web site received from the user's computer.

9. The method of claims 1, 2, 3, or 4, wherein the token identifies the URL of the source Web site.

10. The method of claim 5, 6, 7, or 8, further comprising tracking the source Web site via a token as the user navigates a plurality of pages of the destination Web site.

11. The method of claims 1 or 2, wherein the graphic is a picture related to the products and/or services of the destination Web site.

12. The method of claims 3, 4, 5, or 6, wherein the hyperlink visually represented by a graphic is a picture related to the products and/or services of the destination Web site.

13. The method of claims 1, 2, 3, 4, 5, 6, 7, or 8, wherein the commission is a percentage of the purchase price of the products or services.

14. A method of paying a commission comprising:
- receiving a request for information to be displayed to a user, wherein the request includes a token associated with text identifying a Web page of a destination Web site, wherein the token corresponds to a source Web site that referred the user to the destination Web site;
- transmitting a Web page of the destination Web site in response to the request;
- determining the identity of the source Web site or source entity from the token; and
- paying a commission to a source entity associated with the source Web site for a purchase if the user purchases a product or service after accessing the identified Web page of the destination Web site.

15. A method of paying a commission comprising:
- assigning a unique token to each of a plurality of source Web sites;
- receiving requests for information from a plurality of users, wherein the requests include a token associated with text identifying a Web page of a destination Web site, wherein the token corresponds to one of the plurality of the source Web sites;
- transmitting a Web page of the destination Web site in response to the requests;
- when a user purchases a product or service after accessing the Web page of the destination Web site, using the token provided in the request received from the user to determine the identity of the source Web site; and
- determining and paying a commission for the purchase to a source entity associated with the source Web site.

16. A method of receiving a commission comprising:
- a source Web site transmitting a Web page to a user over the Internet, the Web page including a hyperlink visually represented by text and pointing to a destination Web site, the hyperlink including a token identifying the source Web site such that the token is provided to the destination Web site when the user selects the hyperlink; and
- receiving a commission based on products or services sold to the user who was referred to the destination Web site via the hyperlink.

17. method of purchasing products or services comprising:
- receiving a Web page from a source Web site, wherein the Web page includes a hyperlink visually represented by text and the hyperlink includes information corresponding to the identity of the source Web site;
- transmitting a request for a destination Web page via the hyperlink visually represented by text such that information corresponding to the identity of the source Web site is provided to the Web site corresponding to the destination Web page;
- navigating from the destination Web page to a purchasing page associated with the destination Web page for purchasing a product or service via the use of hyperlinks; and
- purchasing a product or service via the purchasing page, wherein a token is used to identify the source entity associated with the source Web site and paying a commission based on the products or services purchased by a user to the source entity associated with the source Web site.

18. A method of paying a commission comprising:
- sending a source Web page of a source Web site operated by a source entity to a user, wherein the source Web page includes a hyperlink visually represented by text, wherein the hyperlink includes a pointer to a destination Web page of a destination Web site and an identifier of the source Web page;
- requesting the destination Web page by the user's use of the hyperlink;
- navigating from the destination Web page to a purchasing Web page for the purchase of products or services, wherein the identifier of the source entity is maintained as the user navigates from the destination Web page to the purchasing Web page; and
- calculating and paying a commission based on the price of products or services purchased by the user, the commission to be paid to the source entity associated with the source Web site based on the identifier.

19. A method of paying a commission comprising:
- receiving a request for a first Web page from a user, the user being provided with the address of the first Web page by a source Web site;
- transmitting the first Web page to the user;
- receiving a request for a second Web page from the user, the user being provided with the address of the second Web page via a hyperlink visually represented by text from the first Web page,
- tracking the identity of the source Web site such that the identity is retained during or after the transmission of the second Web page;
- transmitting the second Web page to the user;
- receiving a request from the user for the purchase of products or services;
- using the identity of the source Web site to pay a commission to a source entity associated with the source Web page based on the purchase of the products or services by the user; and
- paying the commission.

20. method of purchasing products or services comprising:

receiving a Web page from a source Web site, the Web page including a hyperlink visually represented by text to a destination Web page at a destination Web site;

activating the hyperlink so as to request the destination Web page;

receiving the destination Web page wherein the destination Web page includes a hyperlink to another Web page of the destination Web site; and receiving a purchasing Web page, wherein the purchasing Web page was received by navigating through one or more Web pages starting with the hyperlink included on the destination Web page, wherein the identity of the source Web site remains available to the destination Web site during the navigation; and purchasing a product or service via the purchasing Web page, wherein a payment is made to an entity associated with the source Web site based upon such purchase.

21. A method paying a commission comprising:

transmitting a destination Web page to a user, wherein the user navigated to the destination Web page from a source Web site by a hyperlink visually represented by text;

providing the user with an identification of the source Web site along with the destination Web page so that the identification of the source Web site may be saved on the user's computer;

receiving a request from the user for a Web page of the destination Web site;

receiving the identification of the source Web site from the user's computer;

transmitting the requested Web page of the destination Web site; and paying a commission to be paid if the user purchases a product or service from the destination Web site or a Web page directly or indirectly associated with the destination Web site based on the identification of the source Web site received from the user's computer.

22. The method of claims 14, 15, 16 or 17, wherein the token identifies the URL of the source Web site.

23. The method of claim 18, 19, 20 or 21, further comprising tracking the source Web site via a token as the user navigates a plurality of pages of the destination Web site.

24. The method of claims 14 or 15, wherein the text comprises words related to the products and/or services of the destination Web site.

25. The method of claims 16, 17, 18, or 19, wherein the hyperlink visually represented by text comprises words related to the products and/or services of the destination Web site.

26. The method of claims 14, 15, 16, 17, 18, 19, 20, or 21 wherein the commission is a percentage of the purchase price of the products or services.

* * * * *